(12) United States Patent
Shenkar et al.

(10) Patent No.: US 8,818,076 B2
(45) Date of Patent: Aug. 26, 2014

(54) SYSTEM AND METHOD FOR COST-EFFECTIVE, HIGH-FIDELITY 3D-MODELING OF LARGE-SCALE URBAN ENVIRONMENTS

(76) Inventors: Victor Shenkar, Ramet-Gan (IL); Alexander Harari, Santa Monica, CA (US)

( * ) Notice: Subject to any disclaimer, the term of this patent is extended or adjusted under 35 U.S.C. 154(b) by 1426 days.

(21) Appl. No.: 12/064,474
(22) PCT Filed: Aug. 31, 2006
(86) PCT No.: PCT/US2006/033966
§ 371 (c)(1),
(2), (4) Date: Feb. 22, 2008
(87) PCT Pub. No.: WO2007/027847
PCT Pub. Date: Mar. 8, 2007

(65) Prior Publication Data
US 2008/0221843 A1  Sep. 11, 2008

Related U.S. Application Data

(60) Provisional application No. 60/712,790, filed on Sep. 1, 2005.

(51) Int. Cl.
*G06K 9/62* (2006.01)
(52) U.S. Cl.
USPC ........... 382/154; 345/420; 345/427; 345/672; 382/100; 382/103; 382/218; 382/305; 701/408; 701/414; 701/523; 701/533

(58) Field of Classification Search
CPC ....................................................... G01C 21/32
See application file for complete search history.

(56) References Cited

U.S. PATENT DOCUMENTS 5,029,902 A * 7/1991 Komori ............................ 283/56

(Continued)

OTHER PUBLICATIONS

Yvan G. Leelerc and Steven Q. Lau Jr., "TerraVision: A Terrain Visulization System" SRI International, Menlo Park, California, Tech. Note No. 540, Apr. 22, 1994.

(Continued)

*Primary Examiner* — Tsung-Yin Tsai
(74) *Attorney, Agent, or Firm* — Smith Risley Tempel Santos LLC; Gregory Scott Smith

(57) ABSTRACT

A method, a system, and a program for high-fidelity three-dimensional modeling of a large-scale urban environment, performing the following steps:
  acquiring imagery of the urban environment, containing vertical aerial stereo-pairs, oblique aerial images; street-level imagery; and terrestrial laser scans,
  acquiring metadata pertaining to performance, spatial location and orientation of imaging sensors providing the imagery;
  identifying pixels representing ground control-points and tie-points in every instance of the imagery where the ground control-points and tie-points have been captured;
  co-registering the instances of the imagery using the ground control-points, the tie-points and the metadata, and
  referencing the co-registered imagery to a common, standard coordinate system.
The referenced co-registration obtained enables:
  extraction of ground coordinates for each pixel located in overlapping segments of the imagery, representing a 3D-point within the urban environment; and
  applying data pre-processing and 3D modeling procedures;
  to create the high-fidelity 3D model of a large-scale urban environment.

13 Claims, 18 Drawing Sheets

(56) References Cited

U.S. PATENT DOCUMENTS

| | | | |
|---|---|---|---|
| 5,166,878 A * | 11/1992 | Poelstra | 701/523 |
| 5,517,419 A | 5/1996 | Lanckton et al. | |
| 5,596,494 A | 1/1997 | Kuo | |
| 5,719,773 A | 2/1998 | Choate | |
| 5,966,133 A | 10/1999 | Hoppe | |
| 6,008,808 A * | 12/1999 | Almeida et al. | 715/767 |
| 6,373,482 B1 | 4/2002 | Migdel et al. | |
| 6,442,293 B1 * | 8/2002 | Ito et al. | 382/154 |
| 6,664,529 B2 * | 12/2003 | Pack et al. | 250/208.1 |
| 7,149,346 B2 * | 12/2006 | Oniyama | 382/154 |
| 7,158,878 B2 | 1/2007 | Rasmussen et al. | |
| 7,209,148 B2 | 4/2007 | Rasmussen et al. | |
| 7,280,109 B2 | 10/2007 | Hoppe | |
| 7,310,440 B1 * | 12/2007 | Dolloff | 382/154 |
| 7,933,395 B1 * | 4/2011 | Bailly et al. | 379/201.04 |
| 2002/0060784 A1 * | 5/2002 | Pack et al. | 356/6 |
| 2003/0225513 A1 | 12/2003 | Gagvani et al. | |
| 2004/0105573 A1 * | 6/2004 | Neumann et al. | 382/103 |
| 2004/0193441 A1 * | 9/2004 | Altieri | 705/1 |
| 2005/0119824 A1 | 6/2005 | Rasmussen et al. | |
| 2005/0216186 A1 * | 9/2005 | Dorfman et al. | 701/207 |
| 2005/0251332 A1 | 11/2005 | Entenmann et al. | |
| 2005/0253843 A1 | 11/2005 | Losasso Petterson et al. | |
| 2005/0270299 A1 | 12/2005 | Rasmussen et al. | |
| 2005/0288859 A1 | 12/2005 | Golding et al. | |
| 2006/0200311 A1 * | 9/2006 | Arutunian et al. | 701/210 |
| 2006/0200382 A1 * | 9/2006 | Arutunian et al. | 705/14 |
| 2006/0200383 A1 * | 9/2006 | Arutunian et al. | 705/14 |
| 2006/0200384 A1 * | 9/2006 | Arutunian et al. | 705/14 |
| 2007/0110338 A1 * | 5/2007 | Snavely et al. | 382/305 |
| 2008/0033641 A1 * | 2/2008 | Medalia | 701/209 |
| 2008/0043020 A1 * | 2/2008 | Snow et al. | 345/427 |
| 2010/0046842 A1 * | 2/2010 | Conwell | 382/218 |
| 2010/0123737 A1 * | 5/2010 | Williamson et al. | 345/672 |
| 2010/0208937 A1 * | 8/2010 | Kmiecik et al. | 382/100 |
| 2010/0299166 A1 * | 11/2010 | Waupotitsch et al. | 705/7 |
| 2011/0181589 A1 * | 7/2011 | Quan et al. | 345/420 |

OTHER PUBLICATIONS

Cosman, Michael A., "Global Terrain Texture: Lowering the Cost," Proceedings of the 1994 Image VII Conference, Tempe, Arizona: The Image Society, pp. 53-64.

Byron Spice and Anne Watzman, "Carnegie Mellon Researches Teach Computers to Perceive Three Dimensions in 2-D Images", Carnegie Mellon Media Relations, Jun. 13, 2006, http://www.cmu.edu/PR/releases-06/060613_3d.html.

* cited by examiner

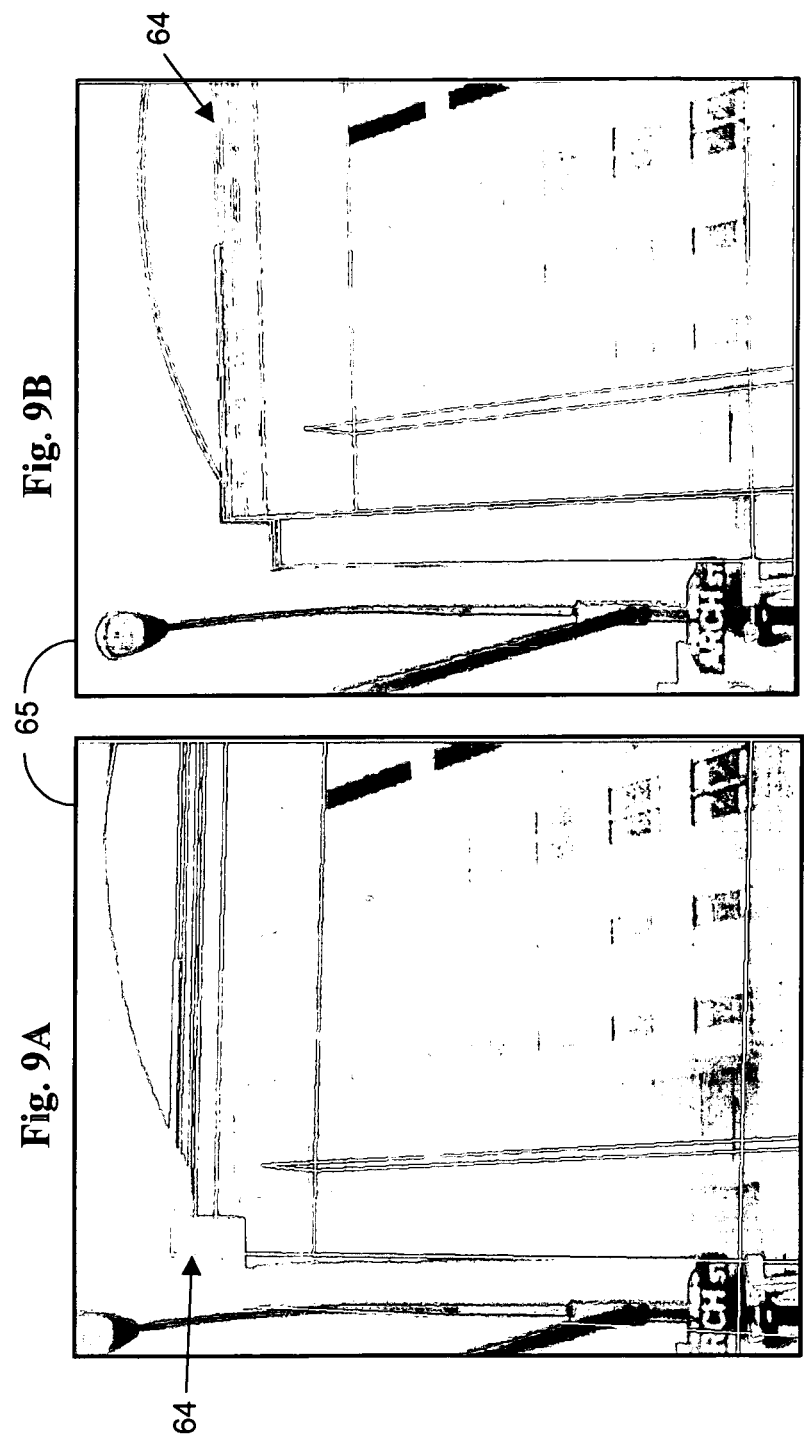

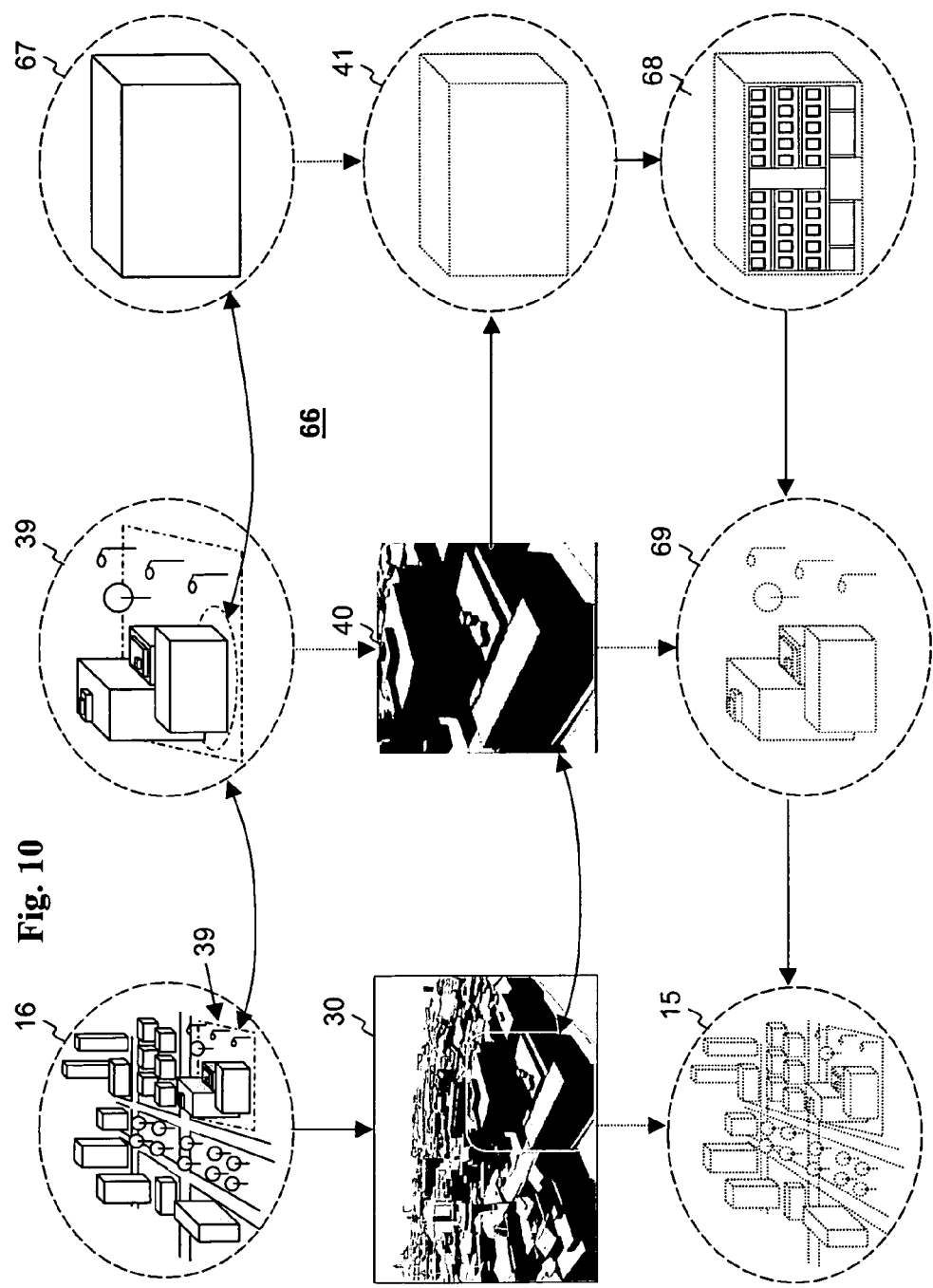

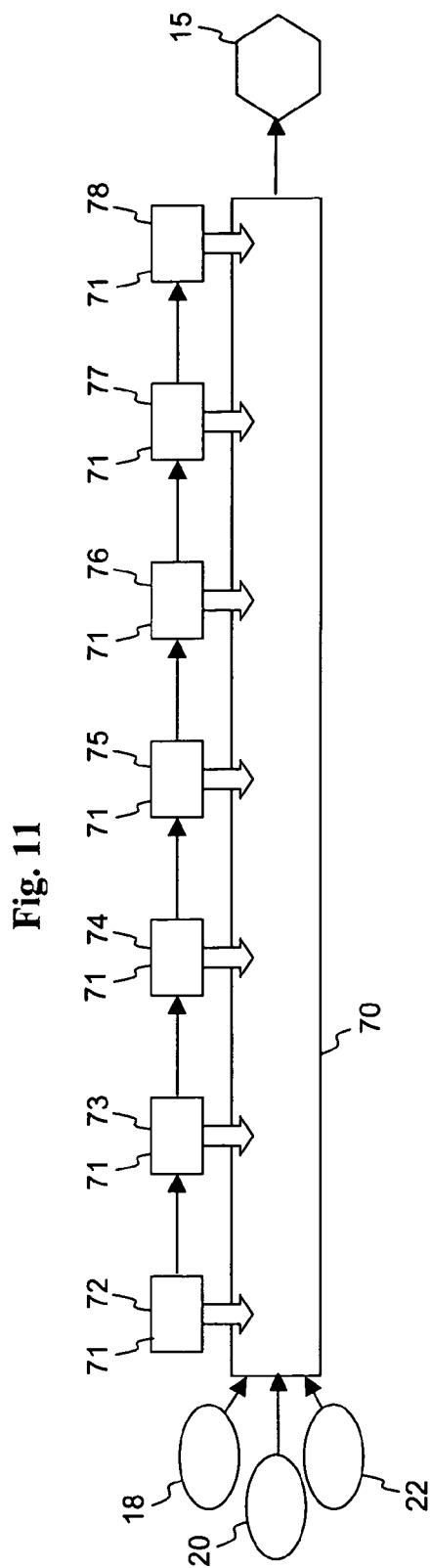

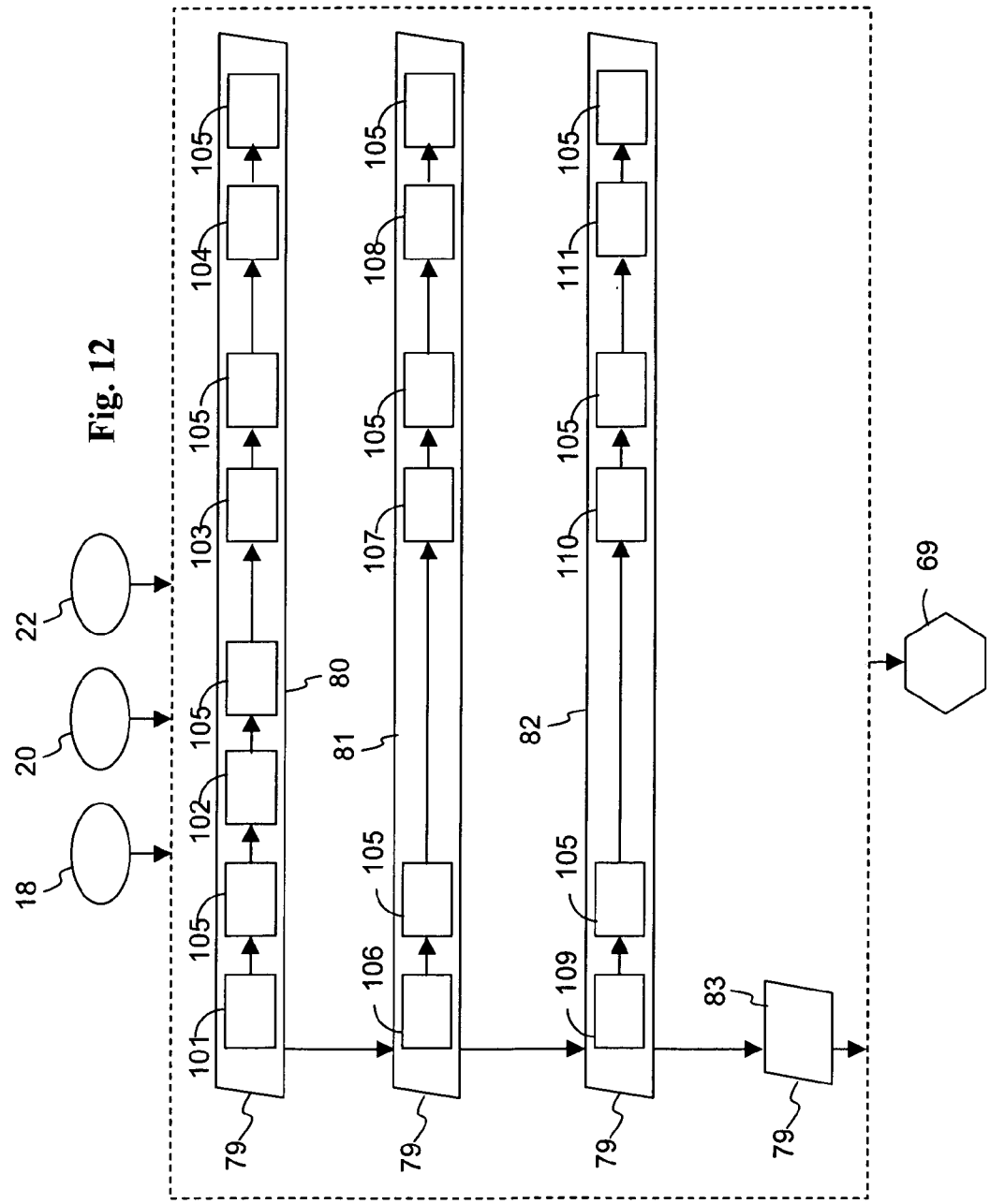

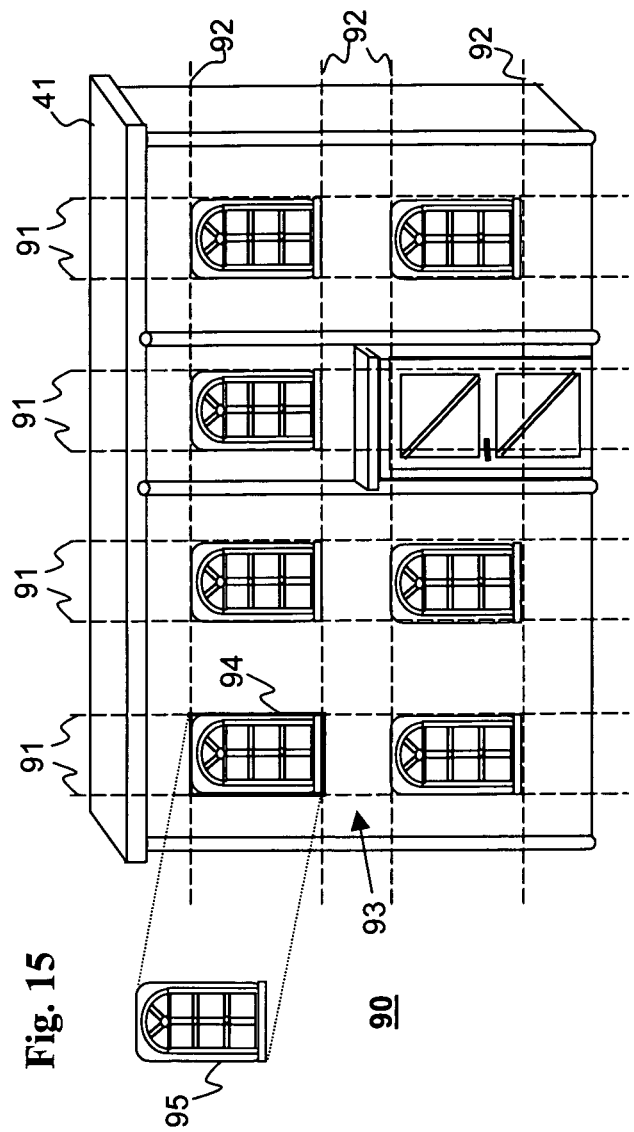

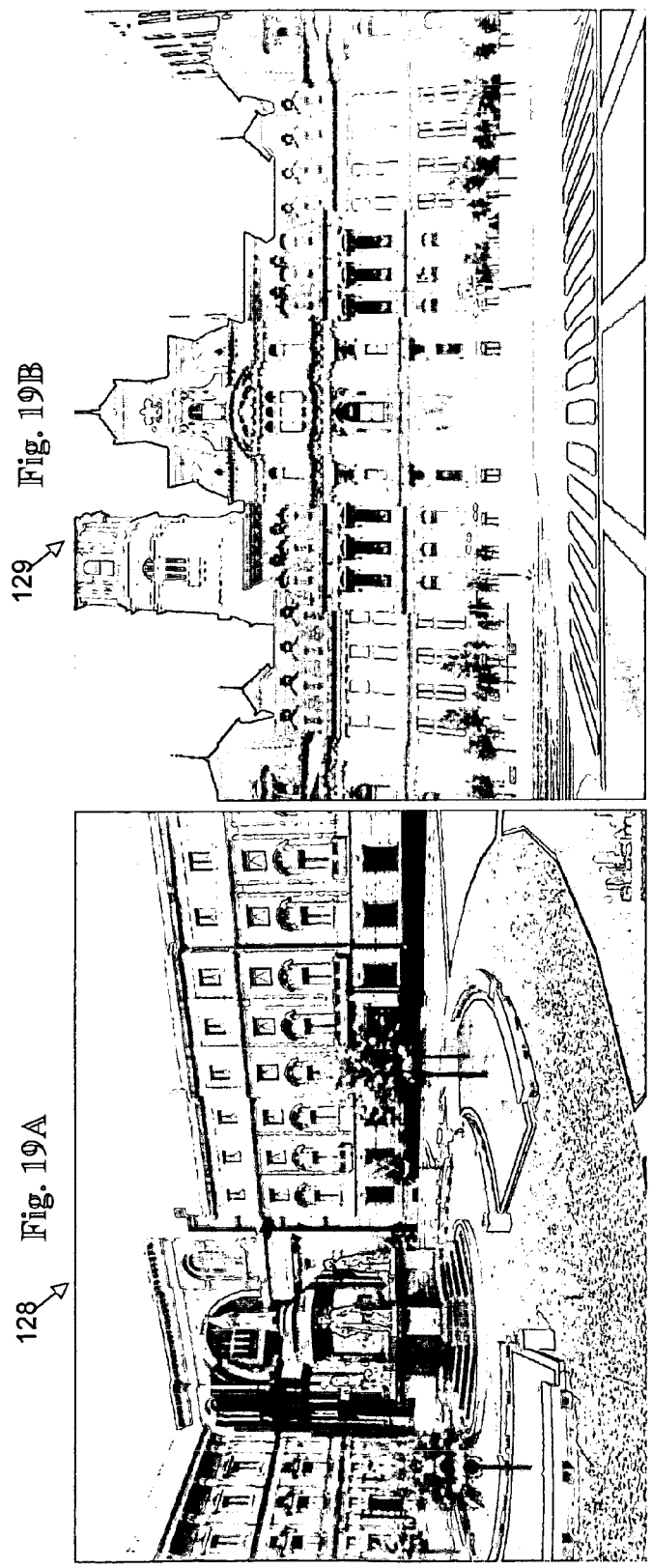

SYSTEM AND METHOD FOR COST-EFFECTIVE, HIGH-FIDELITY 3D-MODELING OF LARGE-SCALE URBAN ENVIRONMENTS

CROSS-REFERENCE TO RELATED APPLICATIONS

The present application is filed under 35 U.S.C. 371 based on PCT International Application PCT/US2006/033966 having an international filing date of Aug. 31, 2006, which application claims priority from a provisional patent application 60/712,790 filed Sep. 1, 2005, the contents of which are hereby incorporated by reference.

FIELD AND BACKGROUND OF THE INVENTION

The present invention relates to a system and a method enabling a cost-effective, high-fidelity, three-dimensional modeling of a large-scale urban environment.

With the proliferation of the Internet, online views of the real world became available to everybody. From static, graphic, two-dimensional maps to live video from web cams, a user can receive many kinds of information on practically any place in the world. Obviously, urban environments are of a great interest to a large number of users.

However, visualization of urban environments is complex and challenging. There exist three-dimensional models of urban environment that are also available online. These models enable a user to navigate through an urban environment and determine the preferred viewing angle. Such three-dimensional urban models are rather sketchy and therefore cannot provide the user the experience of roving through "true" urban places.

The terms "virtual city", "cybertown" or "digital city" frequently appearing on the Web and in other computer applications, are being employed for a variety of information contents and interfaces. An important distinction has to be made in the type of various virtual cities. The following description helps to elucidate this distinction.

"Flat" virtual cities use "flat" image maps of buildings and streets as a static interface. In many cases stylized town maps of familiar landmarks and buildings are used as graphical icons to further online information.

Three-dimensional virtual cities use visual simulation, and/or virtual reality technologies, to model the urban built to varying degrees of accuracy and realism. Such virtual cities are usually navigable in the sense that the user can walk around and fly through the scene. The recently launched Google Earth service features very crude 3D representations ("box-models") of over 30 major US cities. In more intricate 3D-city models, buildings are represented as 3D polygons with textures to add realism. Virtual Reality Modeling Language (VRML) is often used to create such sites, although they are seldom compiled using accurate base map data as geodetic foundation and generally cover only a small part of the city.

Precise "cyber-copies" of actual cities that give their users genuine sense and perception of "real" urban places do not exist yet in commercial applications.

Most of the existing activities aimed at creating "true" virtual cities with photo-realistic built, richness and fullness of geo-referenced information content, crucial to support professional applications and social interaction between the users in a most meaningful and intuitive way, are still at their early research stages.

Currently practiced methodologies to produce precise and complete 3D-city models are extremely laborious and time-consuming. They lead to excessive production cost and schedule, and do not represent a commercially acceptable solution for constructing full-size city models anywhere in the world.

A major productivity improvement in data collection and 3D modeling is needed for transforming the existing high-fidelity urban modeling tools into an industrially viable solution.

There is thus a widely recognized need for, and it would be highly advantageous to have, a system and method for creating a high-fidelity 3D-model of large-scale urban environments, devoid of the above limitations.

SUMMARY OF THE INVENTION

According to one aspect of the present invention there is provided a method for three-dimensional (3D) modeling of an urban environment, the method including:
  a) acquiring imagery of the urban environment including:
    1) aerial imagery including at least one stereo-pair of vertical aerial images, and oblique aerial images taken in four main directions; and
    2) street-level imagery including a plurality of terrestrial photographs, and a plurality of terrestrial laser scans;
  b) acquiring metadata including information pertaining to: performance, spatial location and orientation of imaging sensors providing the aerial imagery and street-level imagery;
  c) identifying pixels representing ground control-points and tie-points in every instance of the imagery, in which the ground control points and tie-points have been captured;
  d) co-registering the instances of the imagery using the ground control-points, the tie-points and the metadata, and
  e) referencing the co-registered imagery to a common, standard coordinate system;

wherein the referenced and co-registered imagery enables extraction of ground coordinates for each pixel located in overlapping segments of the imagery, representing a 3D-point within the urban environment.

According to another aspect of the present invention there is provided the three-dimensional modeling method additionally including:
  f) determining ground coordinates for a collection of selected pixels of the imagery;
  g) forming a three dimensional box-model of selected modeling units spanned over the ground coordinates of the collection of selected pixels; and
  h) incorporating geometric details and textural details into the modeling units forming a high-fidelity 3D-model of the urban environment.

According to yet another aspect of the present invention there is provided the three-dimensional modeling method, wherein the step of incorporating geometric details and textural details into the modeling units forming a high-fidelity 3D-model of the urban environment, includes:
  1) dividing the 3D-model into data-layers including:
    i) a building-models data-layer including at least one 3D building model;
    ii) a terrain-skin data-layer including a 3D terrain skin model; and
    iii) a street-level-culture data-layer including at least one 3D street-level-culture model;
  2) developing the 3D building models, the 3D terrain skin models, and the 3D street-level-culture models;
  3) creating several levels-of-detail for the data layers: and 4) merging corresponding instances of at least one 3D building model, terrain skin model, and street-level-culture models, forming a high-fidelity 3D-model of the urban environment.

According to still another aspect of the present invention there is provided the three-dimensional modeling method additionally including:

i) storing the 3D-model in a database.

Further according to another aspect of the present invention there is provided the three-dimensional modeling method additionally including:

j) dividing the urban environment into city-block segments;

k) applying the steps f to h to each city-block segment to form a 3D model of the city-block segment, independently of other city-block segments; and l) integrating the 3D models of the city-block segments to form an integrated 3D model of the urban environment.

Further according to yet another aspect of the present invention there is provided the three-dimensional modeling method wherein the vertical aerial imagery includes a plurality of stereo-pairs of vertical images providing a continuous coverage of the urban environment and a plurality of oblique aerial images providing a continuous coverage of the urban environment in four main directions.

Further according to still another aspect of the present invention there is provided the three-dimensional modeling method, wherein the step of developing the 3D building models, the 3D terrain skin model, and the 3D street-level-culture models, includes at least one of:

1) automatically importing selected segments of the imagery and associated metadata that are pertinent to modeling a specific city-block segment;

2) automatically identifying best image quality photographic textures of the selected segments;

3) automatically pasting the best image quality photographic textures onto corresponding 3D-geometry;

4) interactively determining spatial location of repetitive 3D-geometric elements;

5) automatically inserting the repetitive 3D-geometric elements into the 3D-model;

6) interactively determining at least one of precise spatial location, physical size, and cross-sections of specific details extracted from the 3D street-level imagery;

7) automatically inserting the specific details into the 3D model of the urban environment;

8) interactively creating templates of building details;

9) selectively implanting the templates into at least one of the 3D building models, terrain skin model and street-level-culture models; and 10) automatically generating a 3D-mesh representing the terrain skin surface, using a predetermined set of 3D-points and 3D-lines ("polylines") belonging to the 3D terrain skin model, without affecting existing 3D-details.

Still further according to another aspect of the present invention there is provided a computer program product, stored on one or more computer-readable media, including instructions operative to cause a programmable processor to:

a) acquire imagery of the urban environment including:

1) aerial imagery including at least one of stereo-pair of vertical aerial images, and oblique aerial images taken in four main directions; and 2) street-level imagery including a plurality of terrestrial photographs, and a plurality of terrestrial laser scans;

b) acquire metadata including information pertaining to: performance, spatial location and orientation of imaging sensors providing the aerial imagery and street-level imagery;

c) identify pixels representing ground control-points and tie-points in every instance of the imagery, in which the ground control-points and tie-points have been captured;

d) co-register the instances of the imagery using the ground control points, the tie-points and the metadata; and e) reference the co-registered imagery to a common, standard coordinate system, enabling thereby extraction of ground coordinates for each pixel located in overlapping segments of the imagery, representing a 3D-point within the urban environment.

Even further according to another aspect of the present invention there is provided the computer program product including additional instructions operative to cause the programmable processor to:

f) determine ground coordinates for a collection of selected pixels in of the imagery;

g) form a three dimensional box-model of selected modeling units spanned over the ground coordinates of the collection of selected pixels; and h) incorporate geometric details and textural details into the modeling units forming a high-fidelity 3D-model of the urban environment.

Additionally according to another aspect of the present invention there is provided the computer program product including additional instructions operative to cause the programmable processor to:

1) divide the 3D-model into data layers including:
   i) a building-models data-layer including at least one 3D building model;
   ii) a terrain-skin data-layer including 3D terrain-skin model; and
   iii) a street-level-culture data-layer including at least one 3D street-level-culture model; and 2) developing the 3D building models, the 3D terrain skin models, and the 3D street-level-culture models;

3) creating several levels-of-detail for the data layers: and 4) merging corresponding instances of at least one the 3D building model, terrain skin model, and street-level-culture models, forming a high-fidelity 3D-model of the urban environment.

Additionally according to yet another aspect of the present invention there is provided the computer program product including additional instructions operative to cause the programmable processor to:

i) storing the 3D-model in a database.

Additionally according to still another aspect of the present invention there is provided the computer program product including additional instructions operative to cause the programmable processor to:

j) divide the urban environment into city-block segments;

k) apply the steps f to h to each city-block segment to form a 3D model of the city-block segment, independently of other city-block segments; and l) integrate the 3D models of the city-block segments to form an integrated 3D model of the urban environment.

Also according to another aspect of the present invention there is provided the computer program product including additional instructions operative to cause the programmable processor to perform at least one function of:

1) import selected segments of the imagery and associated metadata that are pertinent to modeling a specific city-block segment;

2) identify best image quality photographic textures of the selected segments; 3) paste the best image quality photographic textures onto corresponding 3D-geometry;

4) enable a user to interactively determine spatial location of repetitive 3D-geometric elements;

5) insert the repetitive 3D-geometric element into the 3D-model;

6) enable a user to interactively determine at least one of precise spatial location, physical size, and cross-sections of specific details extracted from the 3D street-level imagery;

7) automatically insert the specific details into the 3D model of the urban environment;

8) enable a user to interactively create templates of building details, 9) selectively implant the templates into at least one of the 3D building models, terrain skin model and street-level-culture models; and 10) automatically generate a 3D-mesh representing the terrain skin surfaces, using a predetermined set of 3D-points and 3D-lines ("polylines") belonging to the 3D terrain skin model, without affecting existing 3D-details.

Also according to yet another aspect of the present invention there is provided a method for managing development of a three-dimensional (3D) model of an urban environment, the method including:

a) assigning the task of modeling a city-block segment of the urban environment to a 3D modeler;

b) importing imaging data associated with the city-block segment to a workstation operated by the 3D modeler;

c) monitoring progress of the 3D modeling process of the city-block segment by a production manager; and d) progressively collecting and storing products of the 3D modeling work process.

Also according to still another aspect of the present invention there is provided the method for managing development of a three-dimensional (3D) model of an urban environment additionally including:

e) initiating quality control reviews of the 3D modeling processes according to progress.

According to another aspect of the present invention there is provided the method for managing development of a three-dimensional (3D) model of an urban environment additionally including:

e) providing statistical reports of the 3D modeling processes.

Further according to another aspect of the present invention there is provided a computer program product for managing the development of a three-dimensional (3D) model of an urban environment, the program including instructions operative to cause a programmable processor to:

a) assign the task of modeling a city-block segment of the urban environment to a 3D modeler;

b) import imaging data associated with the city-block segment to a workstation operated by the 3D modeler;

c) monitor progress of the 3D modeling process of the city-block segment by a production manager; and d) progressively collect and store products of the 3D modeling process.

Further according to yet another aspect of the present invention there is provided the computer program for managing the development of a three-dimensional (3D) model of an urban environment, the program including additional instructions operative to cause the programmable processor to:

e) initiate quality control reviews of the 3D modeling processes according to work progress.

Further according to still another aspect of the present invention there is provided the computer program product for managing the development of a three-dimensional (3D) model of an urban environment, the program including additional instructions operative to cause the programmable processor to:

f) provide statistical reports of the 3D modeling processes.

Still further according to another aspect of the present invention there is provided a mobile terrestrial device operative to acquire street-level imagery for three-dimensional (3D) modeling of an urban environment, the mobile terrestrial device including:

a) at least one photographic imaging device;

b) at least one laser scanner; and c) at least one location/orientation measuring device operative to provide ground positioning information of the mobile terrestrial device.

Even further according to another aspect of the present invention there is provided the mobile terrestrial device wherein the photographic imaging device ("camera") including at least one of:

1) a horizontal ("azimuth") rotation manipulator;

2) an elevation manipulator; and 3) at least one camera capable of being pointed to different azimuth and elevation angles.

Additionally according to another aspect of the present invention there is provided the mobile terrestrial device wherein the location/orientation measuring device including at least one of:

1) a GPS receiver;

2) an attitude sensor;

3) at least one fast frame-rate, body-fixed digital camera; and 4) a rotary encoder coupled to a wheel of the mobile terrestrial device.

Additionally according to yet another aspect of the present invention there is provided a computer program product for a mobile terrestrial device, stored on one or more computer-readable media, including instructions operative to cause a programmable processor to collect:

a) street-level imagery including;

1) a plurality of terrestrial photographs; and 2) a plurality of terrestrial laser scans; and b) acquiring metadata including information pertaining to: performance, spatial location and orientation of imaging sensors providing the street-level imagery.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases, the order of process steps may vary without changing the purpose or effect of the methods described.

Implementation of the method and system of the present invention involves performing or completing certain selected tasks or steps manually, automatically, or any combination thereof. Moreover, according to actual instrumentation and equipment of preferred embodiments of the method and system of the present invention, several selected steps could be implemented by hardware or by software on any operating system of any firmware or any combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 9A and 9B, which are simplified illustrations of a box-model wire-frame, projected onto a corresponding street-level photograph, which is also pertinent to the step of aerial and street-level data-fusion of the 3D modeling method of FIG. 2, according to a preferred embodiment of the present invention;

FIG. 10 is a simplified block diagram of the 3D modeling step of the 3D modeling method of FIG. 2, according to a preferred embodiment of the present invention;

FIG. 11 is a simplified block diagram of a 3D modeling software package for a modeling station of the 3D modeling system, used by a 3D modeler to perform the 3D modeling step, according to a preferred embodiment of the present invention;

FIG. 12 is a simplified block diagram of 3D-modeling procedures, performed for a single city-block, according to a preferred embodiment of the present invention;

FIG. 15 is a simplified illustration of an image undergoing interactive geometry splitting, which is a step in the 3D-modeling procedure performed for a single building, according to a preferred embodiment of the present invention;

FIGS. 19A and 19B are rendered images of 3D city models, produced in accordance with the 3D modeling system and method of the present invention, depicting the Piazza La Scala in Milan, Italy, and the City Hall square in Philadelphia, USA.

DETAILED DESCRIPTION OF THE PREFERRED EMBODIMENTS

Figure 1:
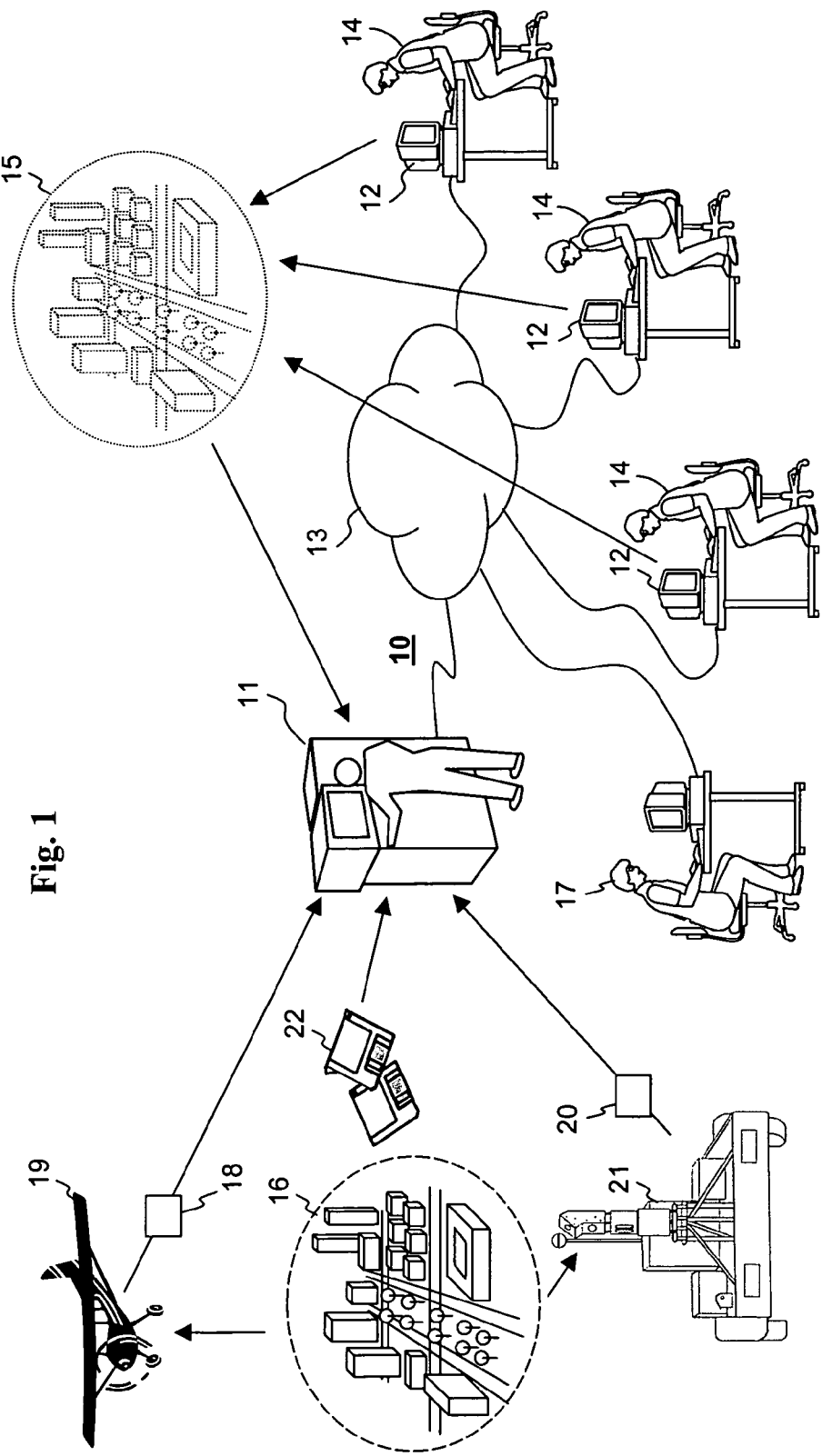
FIG. 1 is a simplified illustration of a three dimensional modeling system for creating high-fidelity, three-dimensional, models of large-scale urban environments, according to a preferred embodiment of the present invention.

The present embodiments comprise systems and methods for creating high-fidelity, three-dimensional models of large-scale urban environments. The principles and operation of a 3D modeling system and method, according to the present invention, may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text has the same use and description as in the previous drawings where it was described.

Reference is now made to FIG. 1, which is a simplified illustration of a three dimensional modeling system 10 for creating high-fidelity, three-dimensional, models of large-scale urban environments, according to a preferred embodiment of the present invention.

As shown in FIG. 1, the three dimensional modeling system (3DMS) 10 preferably includes a server 11, and at least one modeling workstation 12 preferably connected to the server 11 via a communication network 13. The 3DMS 10 enables 3D modelers 14, using the modeling workstations 12, to create an integrated high-fidelity 3-dimensional (3D) model 15 of a large-scale urban area 16. Preferably, the 3D modelers 14 are managed by a production manager 17.

Preferably, three sources, or types of information are acquired into the server 11, and are made available to the modeling workstation 12 for developing the 3D model 15. The three types are:

aerial imagery 18 preferably provided by aerial photography from an airplane 19;

street level imagery 20 preferably provided using mobile street-level data collector (SDLC) 21, and auxiliary three dimensional data 22, typically acquired from a plurality of external information sources.

Implementation of the 3D-Modeling System 10

It is appreciated that most of hardware components of the 3D-modeling system 10 are commercially available off-the-shelf items. Preferably, 3D-modeling computing hardware is based on standard PCs in the following three preferred configurations:

a) An industrial PC, preferably equipped with special-purpose I/O cards, preferably supporting the SLDC 21 data collection and storage.

b) The desktop workstations 12, typically used by 3D-modelers and technical support personnel to perform data preprocessing, data fusion and 3D-modeling, preferably employing an operating system such as Windows 2000/XP or later, available form Microsoft Corporation, One Microsoft Way, Redmond, Wash. 98052-6399, USA.

c) The servers 11, preferably supporting data storage, archiving and client-server communications within the city model production facility, preferably employing an operating system such as Windows 2000/XP or later.

Software components preferably combine:

commercial off-the-shelf products such as: Microsoft Windows, Autodesk 3D Studio, and Erdas Stereo Analyst. Autodesk 3D Studio is available from Autodesk, Inc., 111 McInnis Parkway, San Rafael, Calif. 94903, USA. Erdas Stereo Analyst is available from Leica Geosystems, GIS & Mapping Division, 2801 Buford Highway, Atlanta, Ga. 30329 USA; and special-purpose applications, preferably developed under Microsoft Visual Studio/C++ or later Microsoft software development environment.

All components are preferably integrated into one unified client-server environment.

It is therefore appreciated that, since the 3D-modeling system 10 discussed above is preferably based on the integration of standard building-blocks, the implementation and deployment is highly scalable, as further explained below. It is appreciated that this scalability is key for effective production of large-scale, high-fidelity 3D-city models.

Figure 2:
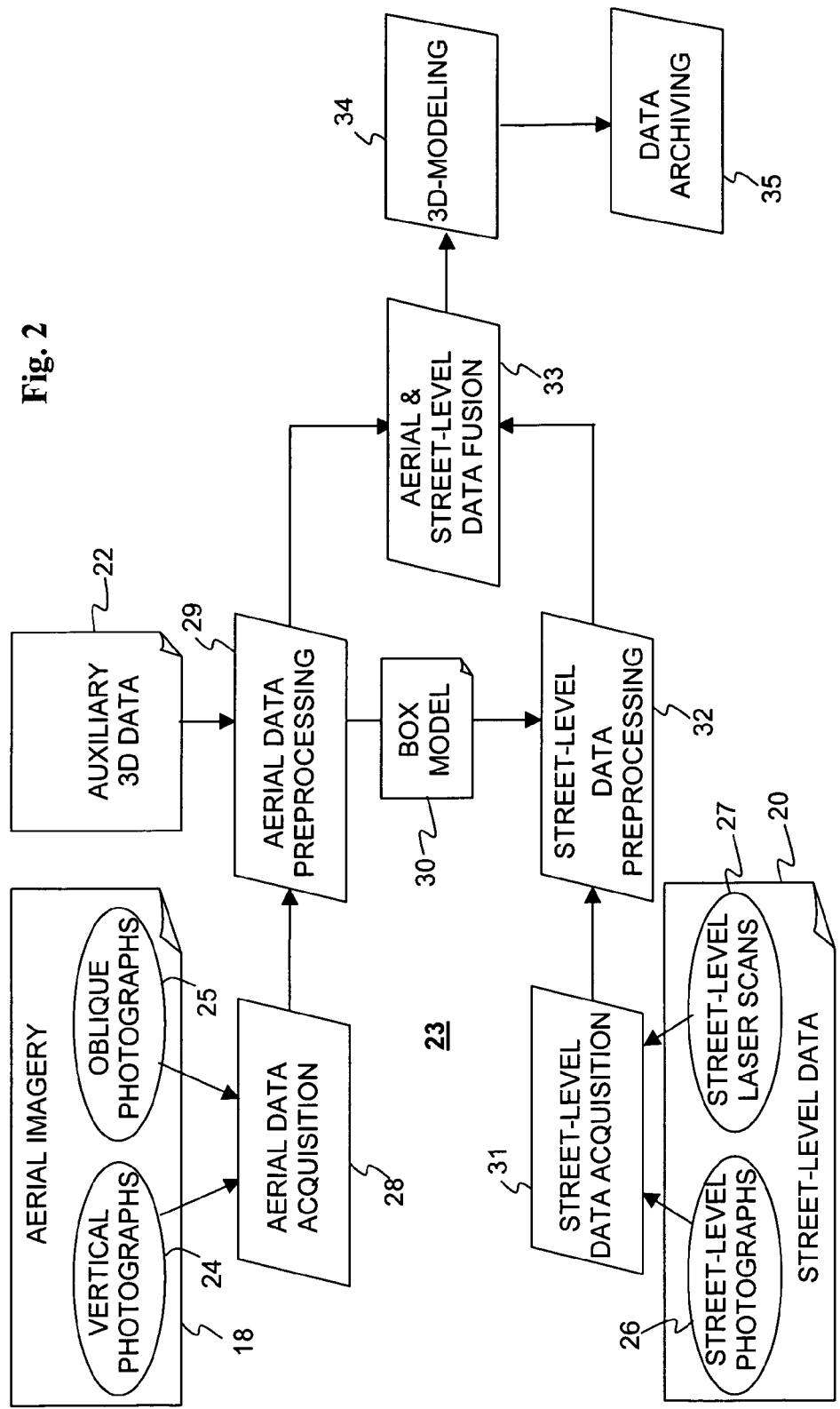
FIG. 2 is a simplified flow diagram of a 3D modeling method for creating the high-fidelity 3D-model of the large-scale urban environment, according to a preferred embodiment of the present invention.

Reference is now made to FIG. 2, which is a simplified flow diagram of a 3D modeling method 23, for creating the high-fidelity 3D-model 15, of the large-scale urban environment 16, according to a preferred embodiment of the present invention.

FIG. 2 presents overall functionality, and general flow of city model production activities, according to the modeling method 23. The modeling method 23 depicted in FIG. 2 preferably employs the three sources of information: the aerial imagery 18, the street level data 20, and the auxiliary 3D data 22. The aerial imagery 18 preferably contains vertical photographs 24, typically taken at an angle of 90° to the ground; and oblique photographs 25, preferably taken at an angle of 45° to the ground. Street-level information 20 preferably contains street-level photographs 26 and street-level laser-scan data 27.

The modeling method 23 preferably contains seven main steps, or processes:

a) Aerial data acquisition 28, b) Aerial data pre-processing 29, which preferably involves the acquisition and use of auxiliary 3D data, and preferably produces a box-model 30 of the urban environment 16, c) Street-level data acquisition 31, d) Street-level data pre-processing 32, e) Data fusion 33 of the aerial imagery 18, auxiliary 3D data 22 and the street level data 20, f) Three-dimensional modeling 34 using the aerial imagery 18, auxiliary 3D data 22 and the street level data 20, and g) Archiving 35 of the three-dimensional model.

Aerial Data Acquisition 28

Aerial data acquisition 28 involves collection and import of vertical aerial photographs 24 taken at a vertical angle, and oblique aerial photographs 25 taken at an oblique angle. Such images are standard aerial photography products, typically based on 150 mm and 300 mm focal-length mapping cameras.

To provide adequate coverage of modeled parts of a city, the photography missions are preferably flown along precisely pre-planned flight paths:

1) Vertical photographs 24 are preferably taken by the 150 mm camera at approximately 3000 ft above the terrain, along a set of parallel, straight-and-level flight lines, providing 60% overlap in both longitudinal and lateral directions.

2) Oblique photographs 25 are preferably taken by a 300 mm camera, preferably mounted on a special-purpose mechanical fixture, preferably at a side-looking angle, typically at a 45°-depression angle, at approximately 2000 ft above the terrain, preferably along 4 sets of parallel, straight-and-level flight lines, providing continuous coverage of the modeled part of a city in 4 major directions (i.e. four headings at ±90° angles).

Hard-copy 230×230 mm negatives (typically black & white for vertical photos and color for oblique ones) produced by the above cameras are preferably scanned with precise photogrammetic scanners in order to convert them to corresponding digital files. With further progress of digital mapping cameras, hard-copy negatives will be replaced by real-time imaging sensors.

To enable automated storage and retrieval, appropriate headers are preferably assigned to the scanned aerial images and metadata describing performance characteristics of the cameras being used and their approximate location and orientation at the image taking instances are also added.

Figure 3:
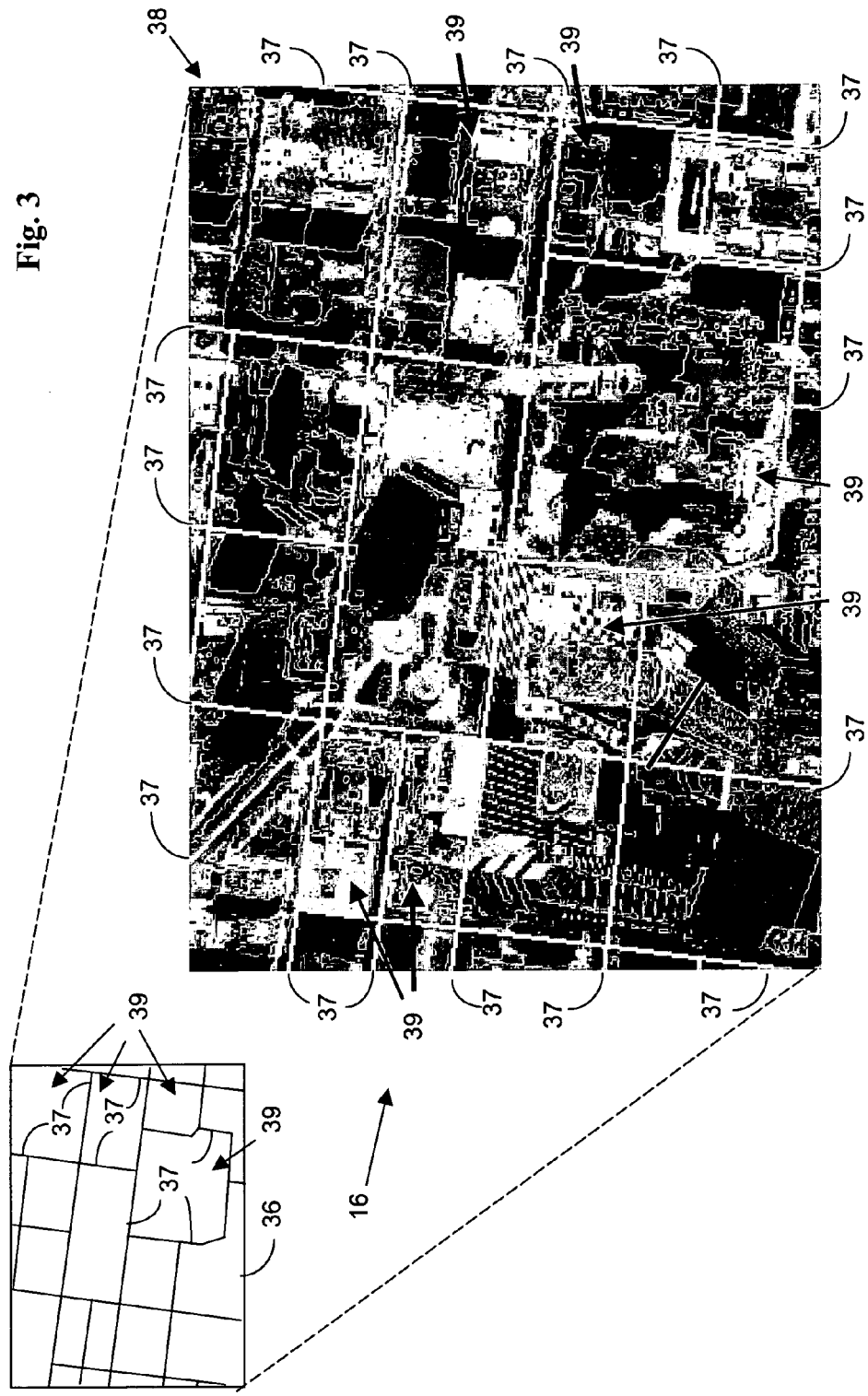
FIG. 3 is a simplified illustration of segmentation of the urban environment, which is pertinent to the step of aerial data preprocessing of the 3D modeling method of FIG. 2, according to a preferred embodiment of the present invention.

Reference is now made to FIG. 3, which is a simplified illustration of segmentation 36 of the urban environment 16, according to a preferred embodiment of the present invention.

As shown in FIG. 3, the segmentation 36 contains borderlines 37, which preferably divides the urban environment 16 presented by vertical aerial photograph 38 into city-blocks 39.

Figure 4:
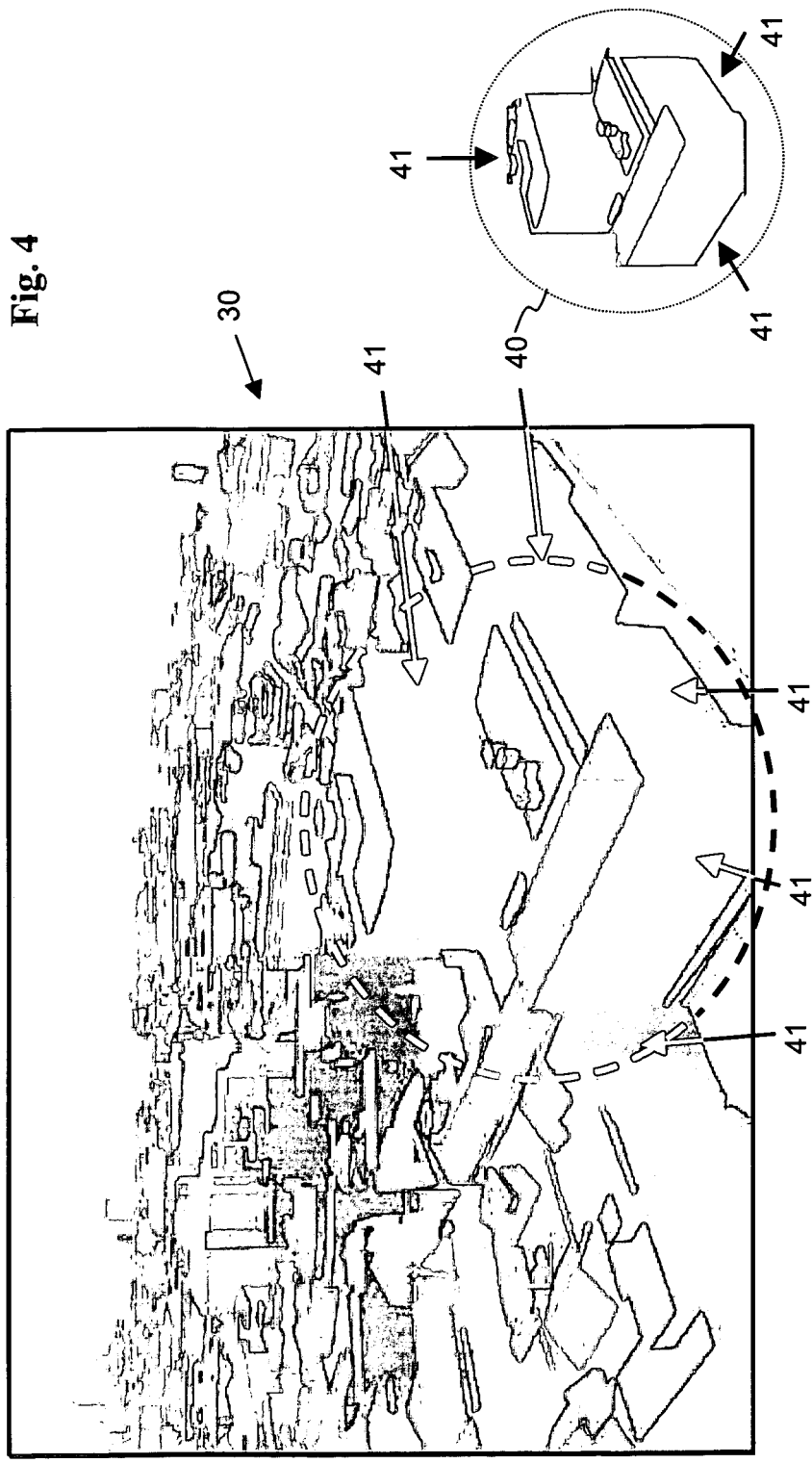
FIG. 4 is a simplified illustration of a three-dimensional city box-model as seen in a perspective view, which is also pertinent to the step of aerial data preprocessing according to a preferred embodiment of the present invention.

Reference is now made to FIG. 4, which is a simplified illustration of the three-dimensional city box-model 30 as seen in a perspective view.

As shown in FIG. 4 the city box-model 30 preferably contains several city-block box-models 40. Preferably, each city-block box-model 40 corresponds to a city-bloc 39.

Aerial Data Preprocessing 29

Referring back to FIGS. 2 and 3, the aerial data preprocessing 29 preferably applies the following three main pre-processing functions to the acquired aerial imagery:

1) Image solving, ortho-mosaicing and orthomosaic-based segmentation of the modeled part of the urban environment 16 into the city-blocks 39, precisely defined by the segmentation 36, as shown in FIG. 3. The city-blocks 39 are delineated in FIG. 3 by the yellow borderlines 37.

2) Stereo-extraction of 3D-lines (so-called 3D-polylines or photogrammetry data) outlining all buildings within each of the city-blocks 39, and the borderlines 37 of the city-blocks 39. Thus, a box-modeling-unit 41 is created for each of the buildings of the city block 39.

3) Proper alignment, rectification and binding of the aforementioned 3D polylines into corrected box-modeling-units 41, representing individual buildings within a city-block 39, as shown in FIG. 4.

It is appreciated that the collection of all box-modeling-unit 41 constitutes the aforementioned city-block box-model 40, and the collection of all city-block box-models 40 constitutes the aforementioned city box-model 30 of the urban environment 16.

Image solving, i.e. finding of 6 degrees of freedom (DOF) parameters representing location and orientation of airborne cameras at the image taking instances, and orthomosaicing functions, are preferably based either on precise Ground Control Points (GCP's) or on precise in-flight INS and/or GPS sensors, and other types of auxiliary 3D data 22.

It is appreciated that, due to high-resolution airborne imagery (5-7 cm per pixel), and high precision GCP's (2-3 cm), the resulting box-models 30 have spatial accuracy of 15-20 cm (location and elevation-wise).

Preferably, the box-model 30 serves as a very precise geodetic foundation for the rest of the 3D-modeling process.

Figure 5:
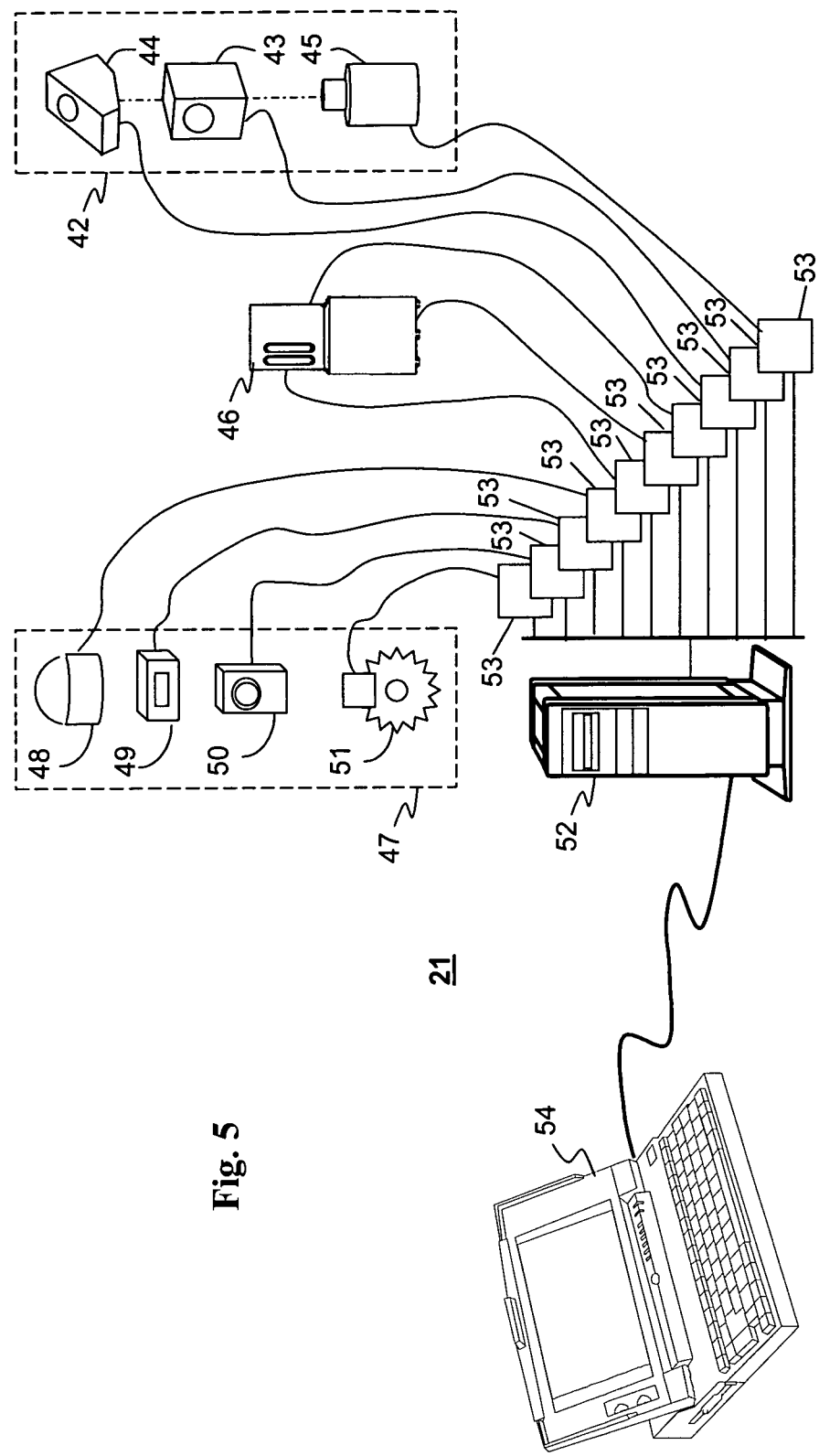
FIG. 5 is a simplified block diagram of a street-level data collector (SLDC), which is a part of the 3D modeling system of FIG. 1 and is pertinent to the step of street-level data-acquisition of the 3D modeling method of FIG. 2, according to a preferred embodiment of the present invention.

Reference is now made to FIG. 5, which is a simplified block diagram of a street-level data collector (SLDC) 21, according to a preferred embodiment of the present invention.

Street-Level Data Acquisition 31

The street-level data acquisition 31 of FIG. 2 preferably involves collection and import of street-level photographs, laser scans and associated metadata needed for reconstruction of details indiscernible from aerial photographs.

Street-level data acquisition 31 is based on the street-level data collector (SLDC) 21, which is preferably mounted on a customized cart or a towed trailer. As shown in FIG. 5 the street-level data collector 31 contains an integrated set of sensors and electronic gear, which preferably include:

a) A camera system 42, preferably containing two digital cameras:

1) a horizontal camera 43 with its optical axis pointed at horizontally, and
2) an oblique camera 44 with its optical axis pointed at 450 elevation angle.

Alternatively, the camera system contains one digital camera with remotely controlled elevation.

Preferably, the camera system can be rotated horizontally and set at different azimuth angles (headings) by a horizontal rotator 45.

b) A two-axis laser scanner 46, preferably providing fast, dense and precise range measurements (point clouds). Alternatively, a number of one-axis laser scanners.

(c) An attitude and navigation subsystem 47, preferably containing at least one differential GPS receiver 48, attitude sensors 49, fast frame-rate, body-fixed digital cameras 50, and a rotary encoder 51 coupled to a wheel of a vehicle carrying the Street-Level Data Collector (SLDC) 21.

(d) A PC 52, (or a number of PC's) serving as a system controller, communication driver and intermediate storage media, and equipped with special interface cards 53 if needed.

(e) A laptop 54, preferably networked with the trailer's PC (typically located in a towing car cabin) serving as a remote terminal to the system.

Figure 6:
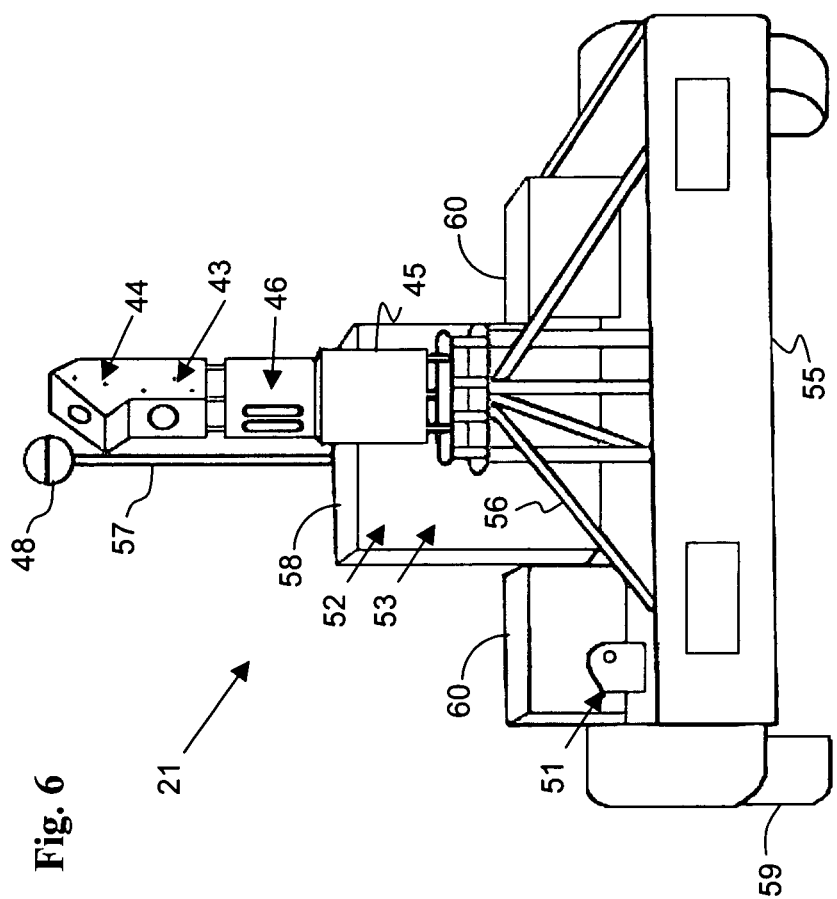
FIG. 6 is a simplified illustration of the street-level data collector (SLDC), according to a preferred embodiment of the present invention.

Reference is now made to FIG. 6, which is a simplified illustration of a street-level data collector (SLDC) 21 mounted on a cart or a trailer 55, according to a preferred embodiment of the present invention.

The Street-Level Data Collector (SLDC) 21, preferably collects the street-level data moving and stopping along pre-planned driving routes. Such routes preferably pass along all the streets of the modeled part of a city.

Depending on street layouts and possible shooting distances, the SLDC 21 preferably applies different scanning patterns. For each stop point, the SLDC 21 preferably collects data of one side. Alternatively and preferably, the SLDC 21 preferably collects data of two sides of the street. Alternatively and preferably, the SLDC 21 preferably collects data of takes a full 360° scan.

As shown in FIG. 6, the SLDC 21 preferably includes the horizontal view camera 43, the oblique view camera 44 and the laser scanner 46, all mounted on the horizontal rotator 45, mounted on a tripod 56. The GPS antenna 48 is mounted on a mast 57. The PC 52 (personal computer, or any other type of computing equipment) and the interface cards 53 are placed in a compartment 58. The rotary encoder mounted on the trailer 55 and connected to the wheel 59. Two batteries 60 provide electric power.

Figure 7A:
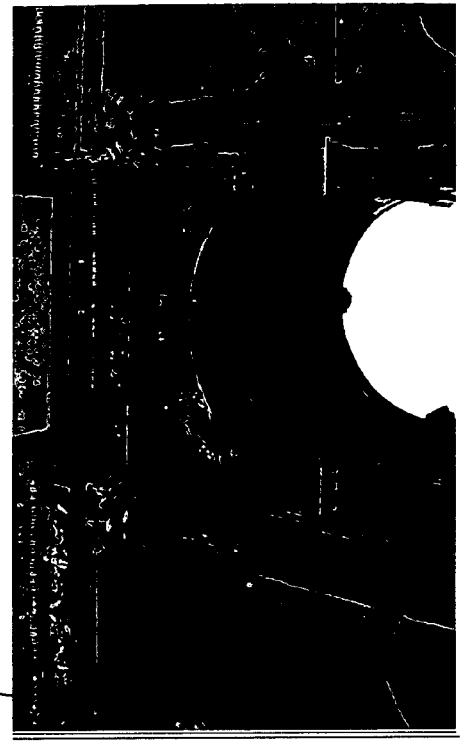
FIGS. 7A, 7B and 7C are, respectively, a horizontal photograph, an oblique photograph, and a laser scan point cloud, of a building taken by the SLDC, according to a preferred embodiment of the present invention.
Figure 7B:
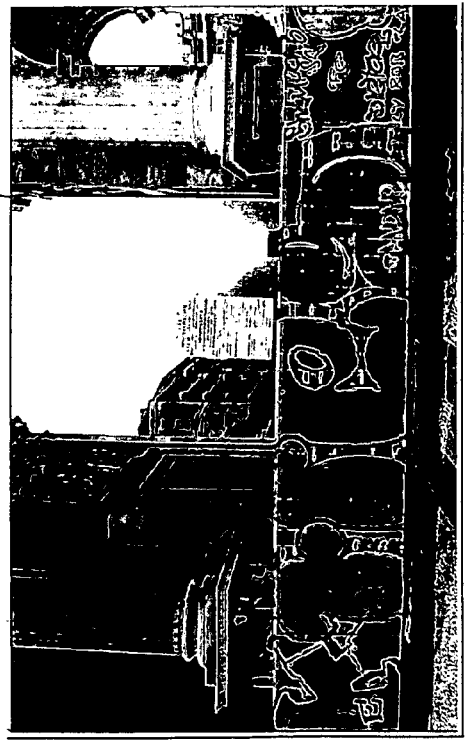
Figure 7C:
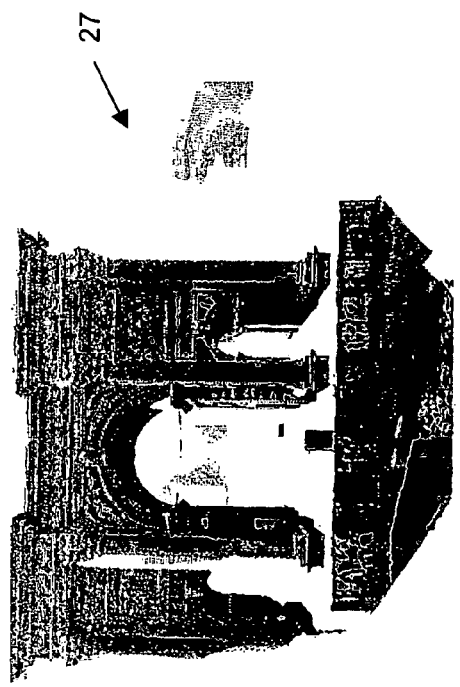

Reference is now made to FIGS. 7A, 7B and 7C, which are simplified illustrations of a horizontal photograph (7A), an oblique photograph (7B) and a laser scan point cloud (7C) of a building, according to a preferred embodiment of the present invention.

FIGS. 7A, 7B and 7C are visual representations of street-level data 20, which includes:

street-level photographs 26, including:
horizontal photograph 61 taken by the horizontal camera 43;
oblique photograph 62 taken by the oblique camera 44; and
laser scan 27 point-cloud data, taken by the laser scanner 46.

The recorded photographs, laser scans, and attitude and navigation data, are preferably time-stamped to enable creation of metadata needed for automated data storage, retrieval and pre-processing.

Street-Level Data Preprocessing 32

The following main preprocessing functions are preferably applied to by the street-level data pre-processing 32 of FIG. 2 to the street-level data acquired by the street-level data acquisition 31 of FIG. 2:

1. Sensor Alignment and Calibration

Geometric distortions of digital cameras are preferably corrected, and for each camera 43 and 44, the interior and exterior parameters are preferably computed. This computation establishes precise location and orientation of digital camera, or cameras, with respect to the laser scanner, or scanners, 46, and with the SLDC axes (preferably by means of data provided by the attitude and navigation subsystem 47). Preferably, the attitude sensors 49, and the wheel rotary encoder 51, are calibrated as well.

2. Initial Registration

Navigational and attitude data recorded by attitude and navigation subsystem 47 are recursively filtered, and preferably augmented with:

a) SLDC-to-wall distance extracted from relative location of the laser point-clouds provided by the laser scanner, or scanners, 46, and
b) solid walls of the corresponding city-block 39, of the city-block box-model 40.

It is appreciated that in this way the 6DOF parameters representing location and orientation of the SLDC 21, at the image and/or scan taking instances (i.e. at stop points) are preferably established.

Given very high resolution of street-level imagery, preferably 1 cm per pixel, the above filtering process preferably provides precise enough registration only if DGPS (Differential Global Positioning System) receivers are able to perform a so-called integer-cycle phase ambiguity resolution, which preferably results in a measurement accuracy of a few centimeters. Otherwise, this initial registration preferably needs further refinement as explained below.

3. Assignment of Street-Level Data 20 to City-Blocks 39

Preferably, all driving paths along which the SLDC 21 has collected street-level data 20, are divided into segments corresponding to previously established city-blocks 39. It is appreciated that in this way the acquired street-level data 20 is properly assigned to corresponding city-blocks 39.

Figure 8:
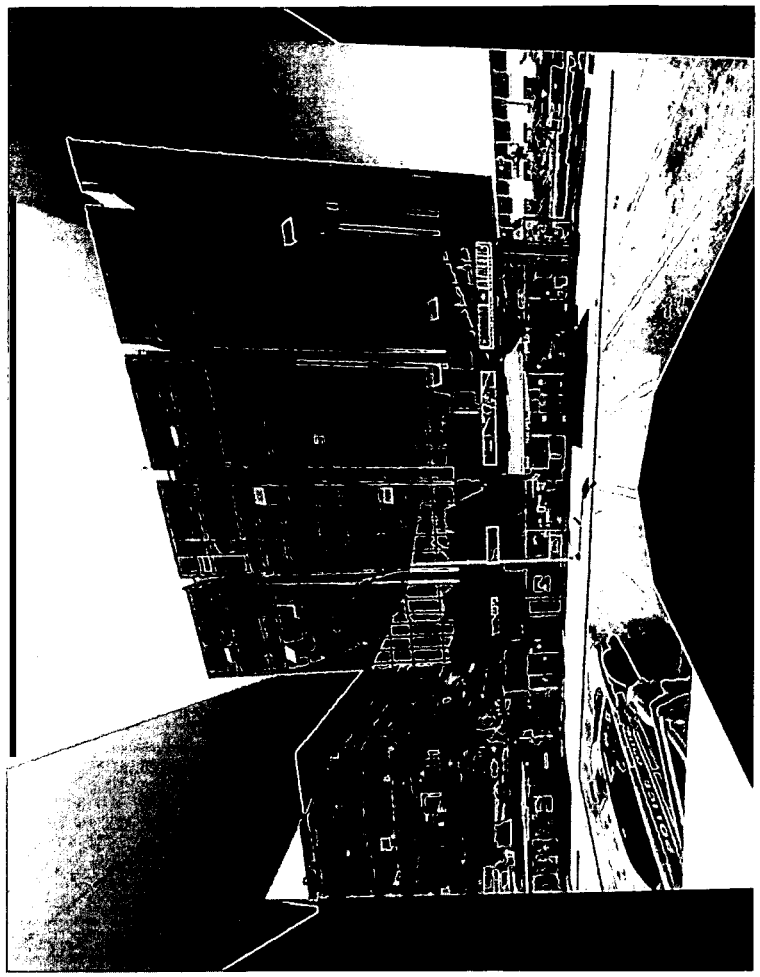
FIG. 8 is a simplified illustration of a unified panoramic street-level image, pertinent to the step of aerial and street-level data-fusion of the 3D modeling method of FIG. 2, according to a preferred embodiment of the present invention.

Reference is now made to FIG. 8, which is a simplified illustration of a unified panoramic street-level image 63, according to a preferred embodiment of the present invention.

FIG. 8 shows a combination of digital images, taken by the two digital still cameras 43 and 44 of FIG. 5. The cameras 43 and 44 are rotated by the camera actuator 45 of the camera system 42, and are set at a number of different azimuth angles at one stop point, to produce the required set of images. These images are then combined by a so-called mosaicing process into the unified panoramic street-level image 63.

It is appreciated that this unified panoramic street-level image 63, which enlarges the instantaneous field-of-view of digital cameras, greatly facilitates recognition and matching of details involved in derivation of the precise collective solution and 3D-modeling in general.

Aerial and Street-Level Data Fusion 33

To efficiently use both aerial and street-level data in the ensuing 3D-modeling process, these two data sets have to precisely merge into one unified data set. Such data fusion is preferably carried out in a two-step process:

a) Precise Relative Solution

This solution is preferably applied to a street-level data subset collected along a driving path segment, which corresponds to one city-block 39. If needed, the initial registration results are re-processed to obtain more precise relative location and orientation of SLDC at the stop points by means of filtering and correlation of overlapping street-level photographs and laser point clouds.

b) Precise Collective Solution

This solution is preferably obtained by adjusting the precise relative solution mentioned above as to achieve the best fit between street-level data belonging to consecutive stop points and to corresponding box-model 30 and/or aerial photos. This is done through three possible matching mechanisms:

1. Preferably by matching selected 3D-points in the laser point clouds with corresponding features of the box-model 30.
2. Preferably by matching selected pixels in the sequential street-level photographs 26.
3. Preferably by matching selected pixels in the street-level photographs 26 with corresponding pixels of aerial imagery 18 projected onto street-level photographs 26.

Reference is now made to FIGS. 9A and 9B, which are simplified illustrations of a box-model wire-frame 64, projected onto a corresponding street-level photograph 65, according to a preferred embodiment of the present invention.

FIGS. 9A and 9B visualize a preferred result of the data fusion process, preferably performed by the data fusion process 33 of FIG. 2. FIGS. 9A and 9B show a box-model wire-frame 64, displayed in white lines, projected onto a corresponding street-level photograph 65.

In FIG. 9A the projection is preferably made according to 6DOF parameters resulting from the step of initial registration, preferably performed by the street-level data pre-processing process 32, described above in accordance with FIG. 2. The registration of the box-model wire-frame 64 and the corresponding street-level photograph 65 is clearly not accurate enough.

FIG. 9B shows the same projection preferably based on more accurate 6DOF parameters resulting from the precise collective solution described above.

It is appreciated that the main purpose of deriving the precise collective solution is to make sure that aerial and street-level data become fully co-aligned, so that one can be freely mix between these data sets anywhere along the 3D-modeling process.

Reference is now made to FIG. 10, which is a simplified block diagram 66 of the 3D modeling step 34 of FIG. 2, according to a preferred embodiment of the present invention.

As shown in FIG. 10, the urban environment 16 is preferably divided into the city-blocks 39 (as discussed with accordance to FIGS. 3 and 4), which are preferably further divided into single building units 67.

Accordingly, the city box-model 30 is preferably created for the urban environment 16, and preferably further divided into the city-block box-models 40, and the box-modeling-unit 41, corresponding to the appropriate city-blocks 39 and buildings 67.

Then, each of the box-modeling-unit 41 is developed into a detailed 3D-modeling-unit 68. The detailed 3D-modeling-units 68 of a city block 39 are integrated into a 3D city-block model 69, and thereafter are further developed and augmented with final details. The 3D city-block models 69 are then integrated to form the high-fidelity 3D model 15 of the large-scale urban area 16.

Sidewalks and Roads as an Infrastructure for Integrated 3D City Model

As further described below, 3D modeling is preferably executed independently on each city-block 39. There are two preferred prerequisites for achieving seamless integration and precise stitching of all the detailed 3D-modeling-units 68 into 3D city-block models 69, and of all neighboring 3D city-block models 69 among themselves:

a) 3D-modeling is preferably executed using a common (global), GPS-compatible coordinate system.

b) the preferred geometric accuracy of each 3D city-block model 69 with respect to this global coordinate system is within 15-20 cm.

To establish a common frame-of-reference for precise integration of adjacent 3D-city-block models 69, a global geometry of city sidewalks and roads is preferably built first. This geometry defines a preferred baseline for 3D modeling of each city-block 39 that is preferably executed later in the process.

Building the geometry of sidewalks and roads preferably starts by the processes described below in accordance with the aerial data pre-processing process 29 and street-level data pre-processing process 32 of FIG. 2. The process of building the geometry of sidewalks and roads preferably use any two possible means:

a) Stereo-extraction of 3D polylines of sidewalks borderlines and 3D points, which preferably define the topographic heights along the city roads.

b) Conversion of DGPS measurements, for which the integer-cycle phase ambiguity can be resolved into a set of 3D points, which preferably define the topographic heights along the city roads.

Preferably, the same set of 3D points defining the topographic heights along the roads is also used during the process performed by the aerial and street-level data fusion 33, to serve as preferred reference heights of the road during the collective street level data solution.

Based on the aforementioned 3D-points, a rough geometry of the roads is built, preferably using Non-Uniform Rational Bi-Spline (NURBS) geometry. The sidewalk border-lines are preferably projected on this geometry, preferably establishing both the roads geometry and the precise heights of the border line which are hard to establish otherwise.

It is appreciated that this process results in a first approximation of the city roads and sidewalk border-lines model and the terrain surface model in general, which are consistent with the street level data solution. It is appreciated that this consistency and precision assures that 3D city-block model 69, which are created separately for each city-block 39, can be seamlessly integrated into a complete city model. Later in the process, fine details and textures are added to such a 3D-model of city roads and sidewalk border lines.

Reference is now made to FIG. 11, which is a simplified block diagram of a 3D modeling software package 70 augmented with a collection of software modules 71, according to a preferred embodiment of the present invention.

The 3D modeling software package 70 is preferably an off-the-shelf 3D modeling solution. The 3D modeling software package 70 is augmented with the following special-purpose software modules 71:

1) Automated selection and import of raw data 72,
2) Automated pasting of the aerial photographs 73,
3) Interactive geometry splitter 74,
4) 3D Helpers 75,
5) Interactive detail builder 76,
6) Terrain-surface mesh generator 77,
7) Texture Modifier 78.

The 3D modeling software package 70 and the software modules 71, are preferably used by the 3D modelers 14 to develop the high-fidelity, three-dimensional, model 15 of the large-scale urban environment 16, using as a "raw" data the aerial imagery 18, the street level data 20, and the auxiliary 3D data 22

Reference is now made to FIG. 12, which is a simplified block diagram of 3D-modeling procedures 79, performed for a single city-block 39, according to a preferred embodiment of the present invention.

Preferably, the 3D modeling procedures 79 are used by the 3D modeler 14 to convert the aerial imagery 18, the street level data 20, and the auxiliary 3D data 22 into the high-fidelity 3D-model 15, of the large-scale urban environment 16. The 3D modeler 14 performing the 3D modeling procedures 79 preferably using the 3D modeling software package 70 augmented with the special-purpose software modules 71. Typically, the 3D modeling procedures 79 and the augmented 3D modeling software package 70 are preferably executed on the modeling workstation 12. The 3D modeling procedures 79 preferably includes the following four steps:

1) Building Model Development 80,
2) Terrain Skin Model Development 81,
3) Street-Level Culture Model Development 82,
4) Levels of Detail Development 83.

In the 3D Modeling step 34 of FIG. 2, each 3D modeler 14 of FIG. 1, preferably working on his or her workstation 12, follows the 3D modeling procedures 79, using the 3D modeling software package 70, to convert aerial imagery 18, street-level data 20 and associated metadata which correspond to the assigned city-block 39, into a 3D city-block model 69.

3D-Modeling 34

It is appreciated that 3D-modeling is the most crucial and time-consuming activity in the entire city model production process. Given the current state-of-the-art, it is appreciated that precise high-fidelity 3D-modeling of urban environments still has to rely on visual perception and manual skills of human operators also known as 3D-modelers. To achieve a significant productivity improvement as compared to the existing, off-the-shelf 3D-modeling solutions, 3D modelers have to be provided with an enhanced 3D-modeling environment, as further described below.

Preferably, the 3D modeling software package 70 uses the Autodesk 3D Studio VIZ, available from Autodesk, Inc., 111 McInnis Parkway, San Rafael, Calif. 94903, USA. The Autodesk 3D Studio VIZ is augmented with a number of seamlessly integrated proprietary plug-ins. Preferably applied in conjunction with standard 3D Studio tools and procedures, the following plug-ins have the most dramatic impact on improved efficiency of the 3D-modeling method 23:

a) The automated selection and import of raw data 72

For a selected modeling unit 41, this function performs the following tasks:

1. Identification of aerial photographs 18, street-level photographs 26, and laser scans 27, in which the selected modeling unit 41 can be seen.
2. Extraction of small segments from the aerial photographs 18 identified to contain the selected modeling unit 41. It is appreciated that full-frame air photos are too big to be manipulated by the 3D Studio.
3. Importing all the raw data that is pertinent to the selected modeling unit 41, including the extracted small segments of the aerial photographs 18 and the corresponding street-level photographs 26, and laser scans 27, and including the relevant metadata (such as 6DOF parameters), into the 3D Studio to create a virtual camera effect.

Based on the above function, 3D-modelers can open viewports, in which the 3D-geometry being developed is overlaid as a wire-frame, or as a solid-wall representation onto properly located and/or oriented photographic backgrounds. It is appreciated that this plug-ins greatly facilitates the ensuing modeling works.

Figure 14B:
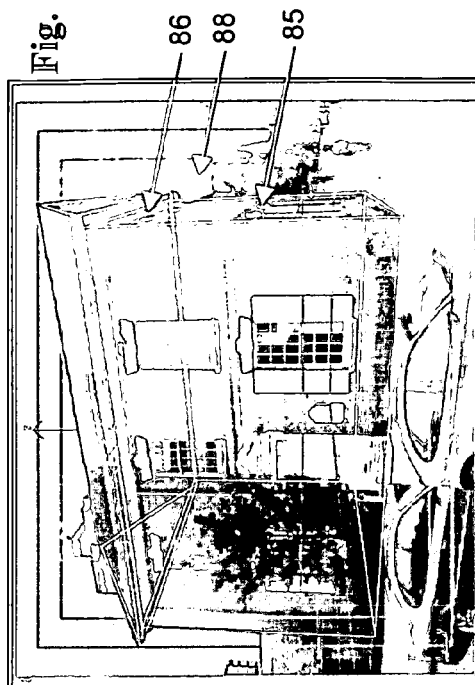
FIGS. 14A, 14B, and 14C are viewports presenting aerial and street-level photographs of the building of FIG. 13.
Figure 14A:
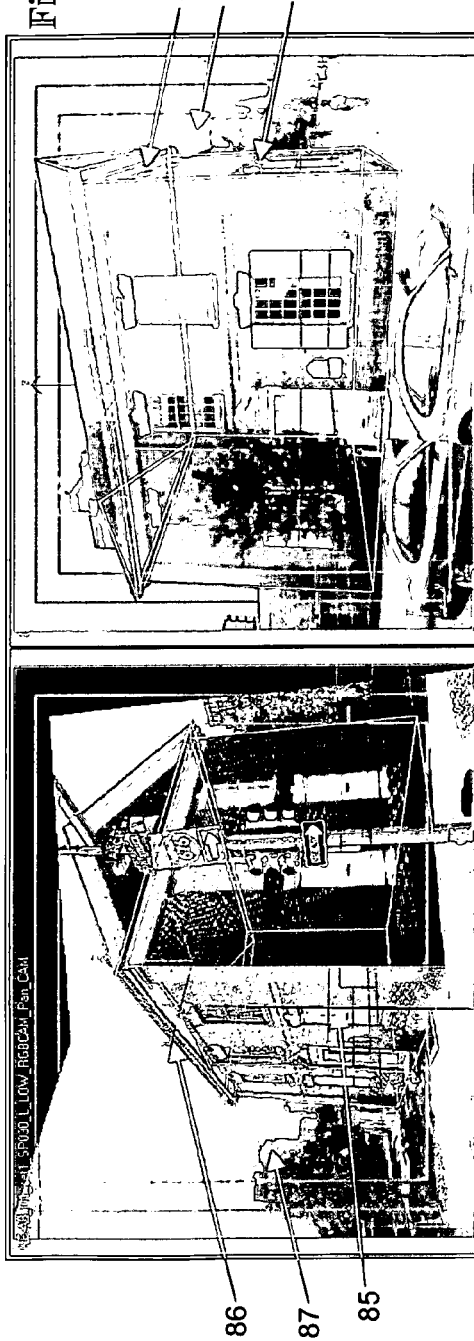
Figure 13:
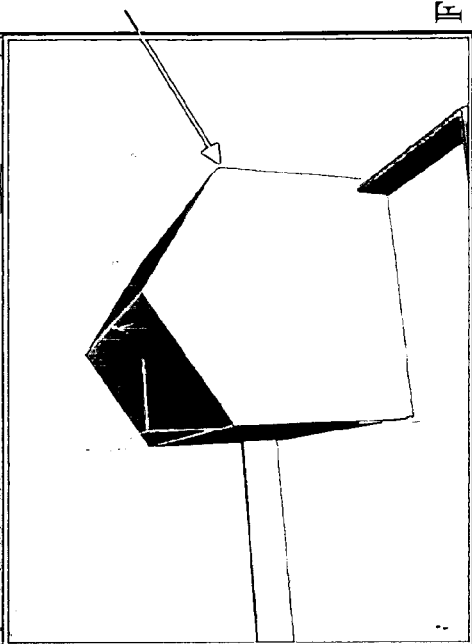
FIG. 13 is simplified viewport of a solid-wall model of a building, which is a pal of the city-block of FIG. 12.
Figure 14C:

Reference is now made to FIG. 13, which is simplified viewport of a solid-wall model 84 of a building 85, and to FIGS. 14A, 14B, and 14C, which are viewports presenting aerial and street-level photographs of the building 85.

As shown in FIGS. 13, 14A, 14B, and 14C, the building 85, which in this case corresponds to the selected modeling units 41 and its wire-frame model 86. The wire-frame model 86 is projected and overlaid onto photographic backgrounds 87, 88 and 89, corresponding to three different views of the same building 85, according to a preferred embodiment of the present invention.

b) The Automated Pasting of the Aerial Photographs 73

The automated pasting of the aerial photographs 73 enables automated pasting of the aerial photographs 18 and/or the street-level photographs 26, onto 3D geometry for a selected modeling unit 41, this function preferably performs the following tasks:

1. Per each face of the box-modeling unit 41, identification of preferably the best the aerial photographs 18 and/or the street-level photographs 26, in which the faces of the box-modeling unit 41 can be seen.

2. For such identified best photos, application of 3D-transforms representing a 3D-warp onto the selected faces of box-modeling unit 41.

3. Texture mapping of such transformed photos, onto corresponding faces of the box-modeling unit 41, including radiometric correction of seam-lines between textures coming from different photographs.

It is appreciated that based on the above function, 3D-modelers can review texture-mapped box-models 30, getting better understanding of further modeling work, and in particular of micro-geometry that needs to be added to the crude box-model geometry. It is further appreciated that this function may be also applied to texture-map photos or parts thereof onto more complex geometry models during later 3D-modeling stages.

Reference is now made to FIG. 15, which is a simplified illustration of a building model 90 undergoing interactive geometry splitting, according to a preferred embodiment of the present invention.

c) The Interactive Geometry Splitter 74

The interactive geometry splitter 74 performs the following tasks for a selected modeling unit 41:

1. Preferably support of initial placement of predetermined number of vertical split-lines 91, and horizontal split-lines 92, for a selected face 93 of the box-modeling unit, which is typically overlaid with at least one of the corresponding (and properly-projected) photographic backgrounds 87, 88, and 89. Thus forming a split-line element 94, which is a two-dimensional area contained between adjacent split-lines.

2. Preferably, support of interactive control of the split-lines, so that their final placement coincides with repetitive geometric elements, such as geometric element 95, belonging to the selected face. Thus, the split-line element coincides with the area of the respective repetitive geometric element. Repetitive geometric elements are, for example: windows, extruded columns, protruded niches, etc.

3. Preferably automatic generation of micro-geometry elements, which are defined by these split-lines (i.e. cuts, extrudes and protrudes), and preferably automatic insertion of these micro-geometry elements into the selected box-modeling unit, preferably based on the final placement of the split-lines onto the respective split-line elements.

It is appreciated that based on the above function, multiple geometric elements with repetitive occurrence can be modeled in a very precise and expedite manner.

d) 3D-Helpers 75

The 3D-helpers module 75 performs the following preferred tasks for a selected modeling unit 41:

1) manual delineation of polygons and vectors of interest ("helpers") of a selected street-level photo or panoramic image, 2) automatic extraction of shapes and/or edges of interest of a selected face pasted with an image, 3) automated calculation of spatial location and/or orientation of the delineated, and/or extracted, polygons and vectors, based on laser scan data, 4) automated generation and insertion of the micro-geometry picked up by means of 3D-helpers into the 3D Studio modeling space.

It is appreciated that, based on the above function, 3D-modelers can quickly determine precise spatial location of fine street-level details, inserting them automatically into the 3D-model being developed.

Figure 16:
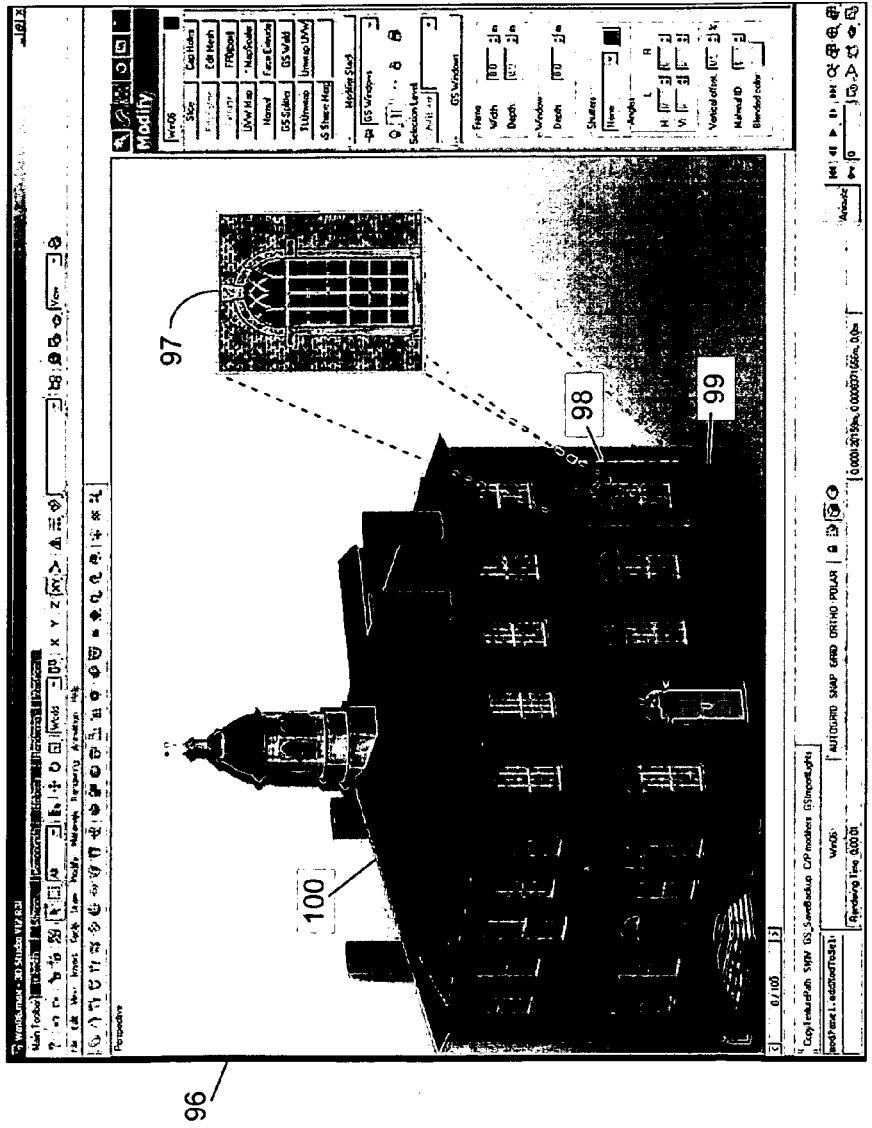
FIG. 16 is a simplified illustration of a screen display of an interactive detail builder tool, which is a part of the 3D modeling software package of FIG. 11, according to a preferred embodiment of the present invention.

Reference is now made to FIG. 16, which is a simplified illustration of a screen display 96 of the interactive detail builder tool 76, according to a preferred embodiment of the present invention.

e) The Interactive Detail Builder 76

The interactive detail builder 76 enables efficient handling of a predetermined set of building details (such as doors, windows, columns, architectural ornaments, etc.) enabling easy insertion of such building details as well as interactive modification of their properties and parameters such as types, states and dimensions. Such building details are automatically generated by the interactive detail builder in a form of geometric elements mapped with corresponding textures ("templates").

The 3D modeler 14 using the preferred screen display 96 shown in FIG. 16 preferably performs insertion of a template 97 in the form of a window, into a tile 98, which is a split-line element of a facade 99, of a 3D building model 100.

It is appreciated that the templates 97 are the 3D Studio VIZ/MAX objects, which can be easily manipulated using standard VIZ tools and procedures. Each template is automatically attached to the tile 98, which can be then merged with a selected wall and/or facade of a 3D-model, simply by connecting the 4 corner vertices of the template to the wall and/or facade.

It is appreciated that the internal integrity of the geometric template (and the tile it is attached to) is automatically assured by the interactive detail builder. All building details can be saved as a preset for later, easy reuse. A pool of preset building details is preferably prepared for most common components. Preferably, these building details become a library. Building details from this library can be used as is, or as a basis for further manipulation. Such manipulations preferably adapt the proportions and the dimensions of the selected building detail to the requirements of the selected modeling unit 41. Further manipulations of details are also possible if needed to accurately represent their actual appearance.

f) Terrain-Surface Mesh Generator 77

The terrain-surface mesh generator function preferably performs the following tasks for a selected city-block 39:

1) Definition of an analytic surface, in which 3D polylines and/or 3D-points extracted from Digital Elevation Model (DEM—which is another data layer in the Auxiliary 3D Data 22) serve as given constraints, for an initial set of 3D polylines and DEM points, which are pertinent to a terrain surface of the selected city-block 39.

2) Generation of optimal mesh representing the initial terrain surface geometry, based on the analytic surface.

3) Re-definition of the initial analytic surface, and re-generation of the optimal mesh, representing an updated terrain surface geometry. This function is preferably executed after insertion of corresponding additional terrain surface polylines created during the 3D-modeling process.

It is appreciated that during later 3D-modeling stages further constraints and features can be added, such as precise borderlines between buildings and adjacent terrain surface. It is appreciated that the terrain-surface mesh generator's function enables this addition to be properly reflected in the terrain surface geometry without spoiling other, already-existing details.

g) Texture Modifier 78

The texture modifier module 78 preferably enables the creation of richer and more diversified textures, without increasing the file size of the texture maps used for city modeling (the texture library). Since many building details share common baseline patterns, such as plaster walls, brick walls, window frames, etc., but differ in their shades and colors, such variations can be represented by blending proper shades and colors onto the same, baseline texture map.

It is appreciated that such blending is done within the 3D Studio modeling environment as an enhancement to the standard material and/or texture tools. Using the texture modifier 78, 3D-modelers are able to interactively preview the blended textures pasting them onto the 3D model. The texture modifier tool accelerates therefore the modeling process by saving the time needed to create many new textures. The texture modifier tool also improves real-time image rendering. Preferably, the graphic engine implementing the modeling method 23 is optimized to support the blended textures with no performance penalty.

The texture modifier is used in conjunction with a texture browser tool. The texture browser preferably enables efficient access to the texture library of the city model, by:
1. dividing accumulated texture maps into categories,
2. querying their properties,
3. importing selected textures into the modeling environment (using a shopping cart tool), and
4. adding new textures to the texture library.

h) Integration

All the aforementioned plug-ins are preferably designed and dedicated to taking a full advantage of:
1) Extensive and comprehensive data collected from the air and from the street-level.
2) Precise integration of all different data sources into one coherent database (data fusion step 33 of FIG. 2), containing vertical aerial photographs 24, oblique aerials photos 25, street-level photographs 26, and laser scans 27.

Preferably, using the tools and procedures described above, the entire 3D modeling cycle is divided and executed on a city-block by city-block basis. The modeling tasks are divided between several 3D-modelers. Typically, each 3D-modeler 14 is assigned with a task of producing a complete 3D city-block model 69.

As shown in FIG. 12, the step of city-block modeling 34 of FIG. 2 is preferably carried out in four main consecutive phases:
1) the development of building models 80,
2) the development of terrain surface model 81,
3) the development of street-level culture model 82.
4) The creation of levels-of-detail 83.

The Development of Building Models (BM) 80

The BM is a digital outdoor representation of houses and other man-built structures (buildings) located within city-block 39 boundaries, by means of a two-part data structure: side-wall and/or roof-top geometry and side wall and/or roof top texture (typically using RGB colors).

Side-wall and roof-top geometry is preferably represented by a specific polygonal mesh. 3D-coordinates of mesh vertices are geo-referenced and have absolute location accuracy of 15-20 cm. In this respect, the term absolute location refers to the location with respect to a geographic datum and/or projection system being used as an underlying 3D-coordinate system. Side-wall/roof-top textures are preferably mapped from the texture library, which is extracted from the aerial and street-level photographs and accumulated during the course of 3D-modeling work. The side-wall and roof-top textures typically provide a reasonably realistic representation of the actual textures. Such mapped textures have resolution better than 2.5 cm per pixel.

The BM is preferably developed throughout four consecutive stages:
1) Preliminary (top-down) design 101,
2) Bottom-side corrections 102,
3) BM side-wall and roof-top geometry 103,
4) BM texture mapping 104.

Quality Assurance (QA) 105 preferably follows each of the four steps above.

1) Preliminary (Top-Down) Design 101

In the preliminary design stage the 3D-modeler 14 preferably examines all available raw materials pertinent to the specific building that has to be modeled and to it's immediate surrounding. The 3D-modeler develops a general understanding of the geometry and textures of the building. Particularly, the 3D-modeler 14 establishes possible instancing, which are repetitive occurrences of certain geometric and/or textural elements of the building as illustrated in FIG. 15 that may significantly simplify the modeling job, and decrease its file size.

2) Bottom-Side Correction 102

In this stage, the 3D-modeler 14 preferably corrects the bottom-side of the building box-model. The correction is done by inserting the precise footprint, which is the borderline between the building and its adjacent terrain that has been extracted from street-level data.

3) BM Side-Wall and Roof-Top Geometry 103

In this stage, the 3D-modeler 14 preferably develops BM side-wall and roof-top geometry, preferably going into a higher level-of-detail at the ground floor, and a slightly lesser level-of-detail for higher elevation.

4) BM Texture Mapping 104

In this stage the 3D-modeler 14 preferably develops BM texture mapping. The 3D-modeler 14 preferably applies around 90% of required texture maps from the existing texture library, and preferably adds up to 10% of new (building-specific) texture maps. It is appreciated that with this method the file size of the texture library is kept at a manageable level.

Preferably, after the completion of each of the above stages, a comprehensive quality assurance 105 is performed by the 3D-modeler's team leader.

Preferably, the above procedure is repeated for each building that belongs to a city-block 39 being modeled.

Development of Terrain Surface Model (TSM) 81

The TSM preferably represents paved and unpaved surfaces of the terrain surface located within city-block 39 boundaries, by means of a two-part data structure: surface geometry and surface textures (preferably using RGB colors).

The terrain surface geometry is preferably represented by a specific polygonal mesh. 3D-coordinates of mesh vertices are geo-referenced and have absolute location accuracy of 15-20 cm. Terrain skin surface texture is preferably mapped from the texture library, as to represent in a reasonably realistic manner the actual textures. Mapped textures have resolution better than 2.5 cm per pixel.

The TSM is preferably developed throughout three consecutive stages:
1) Preliminary design 106,
2) Development of TSM geometry 107,
3) Development of TSM texture mapping 108, Quality Assurance 105 is preferably performed after each of the above three steps.

1) Preliminary Design 106

In the preliminary design stage, the 3D-modeler 14 preferably examines the initial terrain surface model together with all available raw materials pertinent to the terrain surface of a city-block 39 being modeled. The 3D-modeler 14 preferably develops understanding of the geometry and textures of the terrain surface. Particularly, the 3D-modeler 14 identifies special terrain skin features that might not be fully represented by the initial terrain surface model, such as steep slopes, stairs, multi-level piazzas, narrow alleys, etc.

2) Development of TSM Geometry 107

In this stage, the 3D-modeler 14 preferably extracts special terrain skin features from photogrammetry or laser data.

3) Development of TSM Texture Mapping 108

In this stage the 3D-modeler 14 preferably applies texture maps from the existing texture library, adds new terrain surface-specific texture maps. Typically, 90% of required texture maps are available from the existing texture library, while the remaining 10% require special modeling.

Preferably, after the completion of each of the above stages, a comprehensive quality assurance 105 is performed by the 3D-modeler's team leader.

Development of Street-Level Culture Model (SCM) 82

The SCM represents "standard" urban landscape elements located within city-block 39 boundaries. The SCM preferably includes elements such as illumination poles, traffic lights, traffic signs, trash cans, bus stops, benches, trees and vegetation, etc. The typical SCM element contains a two part data structure: object surface geometry and object surface textures (preferably using RGB colors).

The object surface geometry and textures of street-level culture model are preferably mapped from the "street-level culture library", to represent in a reasonably realistic manner the actual street-level culture. The street level library objects are "implanted" into the Terrain Surface Model (TSM) preferably within 15-20 cm absolute location accuracy (as compared to location of actual street-level culture).

The SCM is preferably developed throughout three consecutive stages:

1) Preliminary design 109,
2) Implanting SCM details 110,
3) Development of SCM 3D models 111,
  Quality Assurance 105 is preferably performed after each of the above three steps.

1) Preliminary Design 109

In the preliminary design stage, the 3D-modeler 14 preferably initially examines all available raw materials pertinent to the street-level culture of a city-block 39 being modeled. Then the 3D-modeler 14 preferably develops a general understanding of the content of the street-level culture of a city-block 39 being modeled. Particularly, the 3D-modeler 14 identifies the types of street-level culture elements that do not exist in the current version of the street-level culture library.

2) Implanting SCM Details 110

In the implanting stage of SCM details, the 3D-modeler preferably implants street-level culture elements existing in the current version of street-level culture library, within the 3D city-block model 69, at proper location, orientation and scale.

3) Development of SCM 3D Models 111

In the development stage the 3D-modeler 14 preferably develops both the geometry and the texture of all new street-level culture elements, adds them to the existing library, and implants them within the 3D city-block model 69, at proper location, orientation and scale.

Preferably, after the completion of each of the above stages, a comprehensive quality assurance is performed by the 3D-modeler's team leader.

Figure 17B:
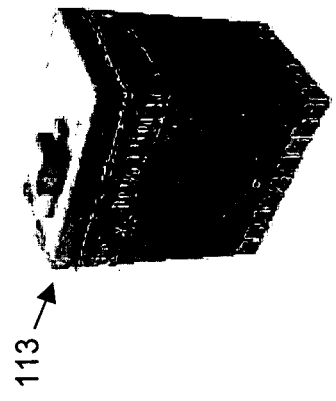
FIGS. 17A, 17B and 17C are simplified illustrations of three levels-of-detail of a 3D-modeling unit, which is the product of the step of 3D modeling performed for a single city-block, according to a preferred embodiment of the present invention.
Figure 17A:
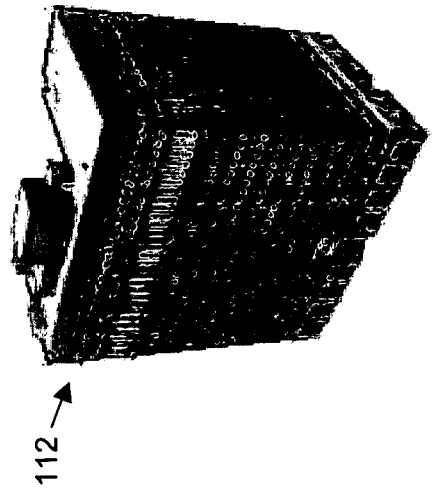
Figure 17C:
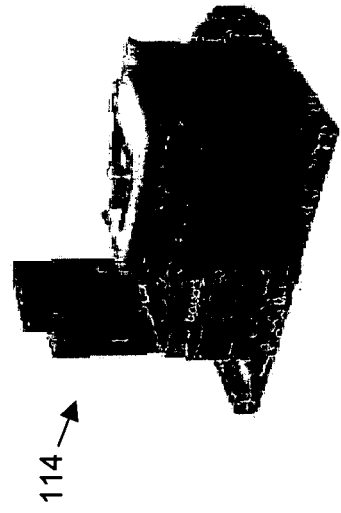

Reference is now made to FIGS. 17A, 17B and 17C, which are simplified illustrations of three levels-of-detail ("LODs") of a 3D-modeling unit 68, according to a preferred embodiment of the present invention. The illustrations of LOD 0, LOD 1 and LOD2 of the 3D-modeling unit 68 are respectively identified by numerals 112, 113, and 114.

Creation of LODs 83

To enable fast rendering and fast communication of 3D content representing the large-scale urban environment 16, the 3D content is preferably divided into spatial quanta, and into levels of detail. Spatial quanta are preferably represented by 3D city-block models 69. Preferably, only the 3D city-block models 69 that appear in the rendered scene are communicated to the rendering processor for rendering. Each city-block 39 is preferably modeled in LODs 83. Only the levels-of detail that are needed for the rendered scene are communicated to the rendering processor for rendering. For example, the detailed LOD 112 is used for close up views while the coarse LOD 113 is used for a broad scenery view.

Hence it is appreciated that in addition to partitioning of the entire city model into city-blocks models 69 (for so-called data paging), efficient real-time image rendering of large-scale city-models also requires that all three data layers in the city model, namely: BM, TSM and SCM, possess a special data structure referred to as LODs. Preferably, all 3D-objects composing the 3D-city model have several LOD data layers, typically of the following 3 pre-built representations:

The LOD 0, identified by numeral 112, is the most detailed representation, preferably developed according to the BM, SCM and TCM procedures described above. The LOD 0 112 is typically used for rendering images at close-up viewing ranges.

The LOD 1, identified by numeral 113, represents simplified geometry and smaller-size (lesser resolution) texture maps, as compared to the LOD 0 112. The LOD 1 113 is typically used for rendering images at mid-viewing ranges.

The LOD 2 114 represents the LOD 1 113 geometry and further dilution of texture maps, as compared to the LOD 1 113. The LOD 2 114 is typically used for rendering images at long viewing ranges.

Typically, the LOD 1 113 is represented by a file-size 5-10 times smaller than corresponding the LOD 0 113 and the LOD 2 114 is represented by a file-size 5-10 smaller than corresponding the LOD 1 113.

The LOD module 83 designed to create the above levels-of-detail operates in the following manner:

For the BM, the LOD 1 112 is preferably created by manual geometry editing (simplification) and semi-automated dilution of textures. The LOD 2 114 textures are created semi-automatically as well.

For the TSM and SCM, the LOD 1 113 and the LOD 2 114 are preferably created automatically. The LOD tool 83 also performs stock cutting, which groups the LOD 1 113 and the LOD 2 114 textures into power-of-two-sized textures. Power-of-two-sized textures are preferably used for efficient real-time image rendering.

Preferably, the BM, TSM and SCM of the LOD 2 114 of the 3D city-block model 69 are combined into a single 3D-object, as shown in FIG. 17C.

Data Archiving 35

The step of data archiving 35 of FIG. 2 is preferably built upon an enterprise-class, object-oriented database with spatial search capabilities. It is appreciated that the use of an enterprise-class, object-oriented database enables gigabytes of image data and 3D vector data in the 3D Studio MAX format to be stored and managed under a version control.

Preferably coupled with the 3D modeling tools, this database facilitates simultaneous work of multiple modeling teams while building and updating the 3D city model 15, as well as during their routine maintenance phase.

Figure 18:
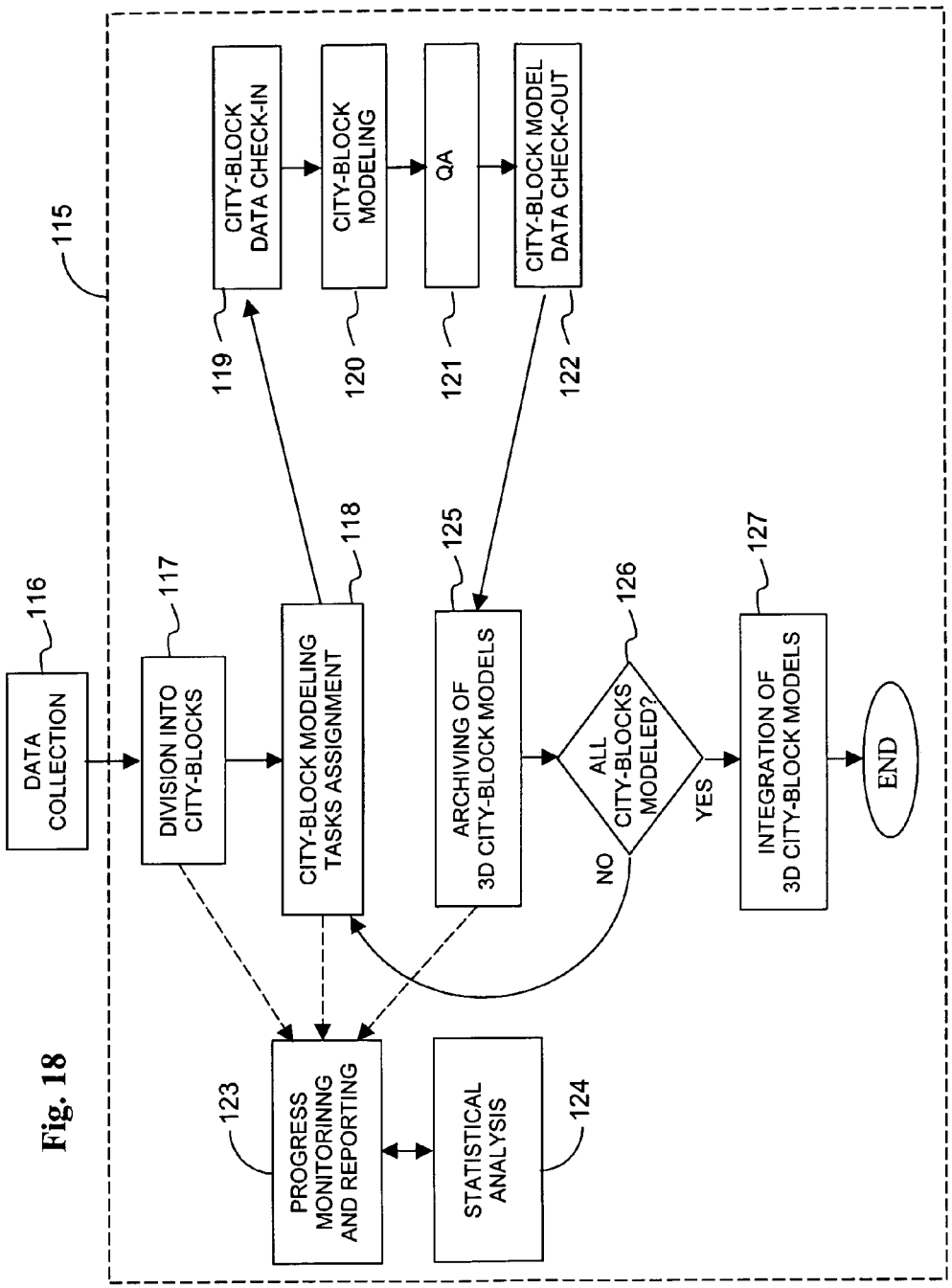
FIG. 18 is a simplified block diagram of a process of managing the steps of data pre-processing and 3D-modeling, according to a preferred embodiment of the present invention.

Reference is now made to FIG. 18, which is a simplified block diagram of a process of managing the steps of data pre-processing and 3D-modeling 115, according to a preferred embodiment of the present invention.

It is appreciated that the process of data pre-processing and 3D-modeling 115 is equivalent to the step of Aerial Data Preprocessing 29, Street-Level Data Preprocessing 32 and 3D Modeling 34 of FIG. 2, which were described above substantially from the point of view of the 3D modeler 14, while the process of data pre-processing and 3D-modeling 115 is described hereinafter substantially from the point of view of the production manager 17.

Data Collection 116

It is appreciated that raw data is collected from the air and on the ground. Typically, aerial data collection does not create any significant bottlenecks, except for possible delays due to bad weather conditions. Typically, it takes few hour-long flights to collect all aerial photographs and then a 2-3 week-long period for film development, digital scanning and GCP survey, to complete the aerial data acquisition process.

It is also appreciated that street-level data collection typically involves considerably more complex logistics and longer schedules. Typically, one SLDC 21 collects 8-10 city-blocks per day. Therefore, the 500 city-block production might take around 2-3 calendar months, including possible delays because of bad weather and congested traffic conditions. Therefore, it is appreciated that to speed up the street-level data collection process is to operate in parallel several SLDC 21 cars. It is further appreciated that, due to use of standard hardware and software components, additional SLDCs 21 can be fully assembled and tested within a matter of weeks.

Data Processing and 3D-Modeling 115

It is appreciated that data processing and 3D-modeling 115 is an intricate and labor-intensive activity. There are two typical pre-requisites to complete the data processing and 3D-modeling 115 within a reasonable schedule:

a) Using a large number of 3D-modelers 14, supported by technical support personnel, working in parallel with minimum constraints, and without interfering with each other.

b) Applying efficient management, and tight coordination to a streamlined data production line.

Division into city-blocks 117 is the first step of the data pre-processing and 3D-modeling 115. In this step the urban environment 16 is divided into city-blocks 39 and each city-block 39 is associated with all the relevant collected data, which is acquired and later-on processed by the step of Aerial & Street-Level Data Fusion 33 of FIG. 2.

It is appreciated that effective coordination and streamlining of the data production line is based on the following operational concept:

a) In step 118 the production manager 17 preferably selects a city-block 39 and assigns the corresponding modeling tasks to an available 3D-modeler 14.

b) The task assignment 118 typically invokes city-block data check-in 119, where all raw materials pertinent to the selected city-block 39 are downloaded, or properly linked, from the production line server 11 to the relevant 3D-modeler workstation 12. Consequently, the 3D-modeler 14 has everything needed to produce a 3D city-block model 69 of the assigned city-block 39.

In the following step 120 the 3D-modeler 14 preferably develops the 3D model of the assigned city-block, preferably performs QA (step 121), and preferably checks out all intermediate and final results of his/her modeling job into the production line server 11 (step 122), to prevent any loss of data, and to give visibility of his/her work status to the production manager 17.

c) The production manager 17, preferably remotely, monitors (step 123) progress of the modeling job, and preferably initiates QA reviews (step 121) and assigns (step 118) the next modeling job as soon as the previous one has been completed.

d) Preferably, statistical analyses (step 124) are constantly applied to production throughput parameters, to help the production manager 17 to assess the performance of individual 3D-modelers 14 and to optimize the ensuing data production planning and scheduling process accordingly.

e) Once all required 3D city-block models 70 have been completed and archived (steps 125 and 126), the production manager 17 initiates a City-Model Integration process (step 127) for integrating all the 3D city-block models 69 into one, unified 3D city model 15.

Implementation of the above operational concept is based on a special-purpose, production-line management software that preferably operates under the Microsoft SQL server, with user-interface preferably based on the DHTML/ASP development and runtime tools.

Previous experience shows that one production manager 17 can effectively supervise up to 25 3D-modelers 14. It is appreciated that one 3D-modeler 14 can produce 1-2 3D city-block models 69 per month. Thus, it is appreciated that a production line of 20-25 3D-modelers 14 turns out 25-50 3D city-block models 69 a month. It is further appreciated that such production line can be replicated at will at a rather moderate cost. It is also appreciated that by dividing the modeled city into several segments and assigning separate production lines manned by 20-25 3D-modelers 14 to each segment, the overall data production throughput can be doubled, tripled or quadrupled.

Reference is now made to FIGS. 19A and 19B, which are rendered images of 3D city models depicting the Piazza La Scala in Milan, Italy 128, and the City Hall square in Philadelphia, USA 129, which were produced applying the data processing and 3D-modeling 115, according to a preferred embodiment of the present invention. FIGS. 19A and 19B exemplify the modeling quality resulting from skillful exploitation of the data processing and 3D-modeling 115.

It is therefore appreciated that the three dimensional modeling system 10 for creating the high-fidelity, three-dimensional, model 15 of the large-scale urban environment 16, being implemented as an integrated, multi-user, client-server solution 10, provides unprecedented productivity in carrying out turn-key, city-modeling projects.

It is expected that during the life of this patent many relevant photographic, photogrammetic, navigational, geodetic means and devices, RADAR and LIDAR scanners and similar devices and systems operated from satellites, airplanes and terrestrial vehicles will be developed, and the scope of the terms herein, particularly of the terms "aerial photography" and "street-level photography", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for three-dimensional (3D) modeling of an urban environment, said method comprising the steps of:
   a) acquiring 3D aerial imagery of said urban environment;
   b) acquiring 3D street-level imagery of said urban environment;
   c) identifying pixels representing ground control-points and tie-points in every instance of said imagery, in which said ground control points and tie-points have been captured; and
   d) co-registering said instances of said 3D aerial imagery and said 3D street-level imagery using at least one of ground control-points and tie-points;
   wherein said co-registered imagery enables extraction of ground coordinates for each pixel located in overlapping segments of aerial imagery and said street-level imagery representing a 3D-point within said urban environment and the ability to switch between over lapping segments.

2. A three-dimensional modeling method according to claim 1, additionally comprising the steps of:
   e) determining ground coordinates for a collection of selected pixels of said aerial imagery;
   f) forming a three dimensional box-model of selected modeling units spanned over said ground coordinates of said collection of selected pixels; and
   g) incorporating geometric details and textural details taken from said street-level imagery into said modeling units forming a high-fidelity 3D-model of said urban environment.

3. A three-dimensional modeling method according to claim 2, wherein said step of incorporating geometric details and textural details into said modeling units forming a high-fidelity 3D-model of said urban environment further comprises:
   1) dividing said 3D-model into data-layers comprising:
      i) a building-models data-layer comprising at least one 3D building model;
      ii) a terrain-skin data-layer comprising a 3D terrain skin model; and
      iii) a street-level-culture data-layer comprising at least one 3D street-level-culture model;
   wherein said building-models data-layer is at least partially based on said aerial imagery and wherein said terrain skin model and street-level-culture model are at least partially based on said street-level imagery.

4. A three-dimensional modeling method according to claim 3, further comprising:
   2) developing said 3D building models, said 3D terrain skin models, and said 3D street-level-culture models;
   3) creating several levels-of-detail for said data layers: and
   4) merging corresponding instances of said at least one 3D building model, terrain skin model, and street-level-culture models, forming a high-fidelity 3D-model of said urban environment.

5. A three-dimensional modeling method according to claim 4, further comprising:
   j) dividing said urban environment into city-block segments;
   k) applying said steps (f) through (h) to each city-block segment to form a 3D model of said city-block segment, independently of other city-block segments; and
   l) integrating said 3D models of said city-block segments to form an integrated 3D model of said urban environment.

6. A three-dimensional modeling method according to claim 1, wherein said vertical aerial imagery comprises a plurality of stereo-pairs of vertical images providing a continuous coverage of said urban environment and a plurality of oblique aerial images providing a continuous coverage of said urban environment in four main directions.

7. A three-dimensional modeling method according to claim 4, wherein said step of developing said 3D building models, said 3D terrain skin model, and said 3D street-level-culture models comprises at least one of the steps selected from the group of steps comprising:
   1) automatically importing selected segments of said imagery and associated metadata that are pertinent to modeling a specific city-block segment;
   2) automatically identifying best image quality photographic textures of said selected segments;
   3) automatically pasting said best image quality photographic textures onto corresponding 3D-geometry;
   4) interactively determining spatial location of repetitive 3D-geometric elements;
   5) automatically inserting said repetitive 3D-geometric elements into said 3D-model;
   6) interactively determining at least one of: precise spatial location, physical size, and cross-sections of specific details extracted from said 3D street-level imagery;
   7) automatically inserting said specific details into said 3D model of said urban environment;
   8) interactively creating templates of building details;
   9) selectively implanting said templates into at least one of said 3D building models, terrain skin model and street-level-culture models; and
   10) automatically generating a 3D-mesh representing said terrain skin surface, using a predetermined set of 3D-points and 3D-lines ("polylines") belonging to said 3D terrain skin model, without affecting existing 3D-details.

8. A computer program product, stored on one or more non-transitory computer-readable media, comprising instructions operative to cause a programmable processor to:
   a) acquire imagery of said urban environment comprising:
      1) 3D aerial imagery comprising at least one of:
         i) stereo-pair of vertical aerial images; and ii) oblique aerial images taken in four main directions; and
      2) 3D street-level imagery comprising;
         i) a plurality of terrestrial photographs; and
         ii) a plurality of terrestrial laser scans;
   b) acquire metadata comprising information pertaining to: performance, spatial location and orientation of imaging sensors providing said aerial imagery and street-level imagery;
   c) identify pixels representing ground control-points and tie-points in every instance of said imagery, in which said ground control-points and tie-points have been captured;
   d) co-register said instances of said imagery using said ground control points, said tie-points and said metadata; and
   e) reference said co-registration of said imagery to a common, standard coordinate system, enabling thereby extraction of ground coordinates for each pixel located in overlapping segments of said imagery, representing a 3D-point within said urban environment.

9. A computer program product according to claim 8, comprising additional instructions operative to cause said programmable processor to:
- f) determine ground coordinates for a collection of selected pixels of said imagery;
- g) form a three dimensional box-model of selected modeling units spanned over said ground coordinates of said collection of selected pixels; and
- h) incorporate geometric details and textural details into said modeling units while forming a high-fidelity 3D-model of said urban environment.

10. A computer program product according to claim 9, comprising additional instructions operative to cause said programmable processor to:
- 1) divide said 3D-model into data layers comprising:
  - i) a building-models data-layer comprising at least one 3D building model;
  - ii) a terrain-skin data-layer comprising 3D terrain-skin model; and
  - iii) a street-level-culture data-layer comprising at least one 3D street-level-culture model; and
- 2) develop said 3D building models, said 3D terrain skin models, and said 3D street-level-culture models;
- 3) create several levels-of-detail for said data layers: and
- 4) merge corresponding instances of at least one said 3D building model, terrain skin model, and street-level-culture models, forming a high-fidelity 3D-model of said urban environment.

11. A computer program product according to claim 10, comprising additional instructions operative to cause said programmable processor to:
- i) store said 3D-model in a database.

12. A computer program product according to claim 11, comprising additional instructions operative to cause said programmable processor to:
- j) divide said urban environment into city-block segments;
- k) apply said steps f to h to each city-block segment to form a 3D model of said city-block segment, independently of other city-block segments; and
- l) integrate said 3D models of said city-block segments to form an integrated 3D model of said urban environment.

13. A computer program product according to claim 10, comprising additional instructions operative to cause said programmable processor to perform at least one function selected from the group of functions consisting of:
- 1) import selected segments of said imagery and associated metadata that are pertinent to modeling a specific city-block segment;
- 2) identify best image quality photographic textures of said selected segments;
- 3) paste said best image quality photographic textures onto corresponding 3D-geometry;
- 4) enable a user to interactively determine spatial location of repetitive 3D-geometric elements;
- 5) insert said repetitive 3D-geometric element into said 3D-model;
- 6) enable a user to interactively determine at least one of: precise spatial location, physical size, and cross-sections, of specific details extracted from said 3D street-level imagery;
- 7) automatically insert said specific details into said 3D model of said urban environment;
- 8) enable a user to interactively create templates of building details;
- 9) selectively implant said templates into at least one of said 3D building models, terrain skin model and street-level-culture models; and
- 10) automatically generate a 3D-mesh representing said terrain skin surfaces, using a predetermined set of 3D-points and 3D-lines ("polylines") belonging to said 3D terrain skin model, without affecting existing 3D-details.

* * * * *